United States Patent
Hashimoto et al.

(10) Patent No.: US 8,689,819 B2
(45) Date of Patent: Apr. 8, 2014

(54) RAINWATER CATCHMENT APPARATUS AND PLANT CULTIVATING SYSTEM HAVING RAINWATER CATCHMENT APPARATUS

(75) Inventors: Masaki Hashimoto, Ibaraki (JP); Yoshiro Miyake, Yao (JP)

(73) Assignee: Suntory Holdings Limited, Osaka-shi, Osaka (JP)

( * ) Notice: Subject to any disclaimer, the term of this patent is extended or adjusted under 35 U.S.C. 154(b) by 298 days.

(21) Appl. No.: 12/741,521

(22) PCT Filed: Oct. 30, 2008

(86) PCT No.: PCT/JP2008/069772
§ 371 (c)(1),
(2), (4) Date: Aug. 23, 2010

(87) PCT Pub. No.: WO2009/060784
PCT Pub. Date: May 14, 2009

(65) Prior Publication Data
US 2010/0307057 A1    Dec. 9, 2010

(30) Foreign Application Priority Data
Nov. 7, 2007    (JP) ................................. 2007-289929

(51) Int. Cl.
*F16L 5/00*    (2006.01)
*E04D 13/00*    (2006.01)
*E04D 13/08*    (2006.01)

(52) U.S. Cl.
USPC .................................. 137/357; 52/12; 52/16

(58) Field of Classification Search
USPC .............. 47/21.1, 79, 80, 81; 137/357, 236.1; 52/12, 16
See application file for complete search history.

(56) References Cited

U.S. PATENT DOCUMENTS 4,934,404 A * 6/1990 DeStefano ..................... 137/357
2005/0257433 A1 * 11/2005 Dussault et al. .................. 52/12

FOREIGN PATENT DOCUMENTS

| JP | 53-148840 | 12/1978 |
| JP | 5-256004 | 10/1993 |
| JP | 2000-64526 | 2/2000 |

OTHER PUBLICATIONS

International Search Report mailed Dec. 2, 2008 in International Application No. PCT/JP2008/069772.

* cited by examiner

*Primary Examiner* — Monica Williams
(74) *Attorney, Agent, or Firm* — Drinker Biddle & Reath LLP

(57) ABSTRACT

The present invention provides a rainwater catchment apparatus that is easily installed without renovating a building. The rainwater catchment apparatus comprises a rainwater inlet for introducing rainwater, a flange portion engaged with a peripheral portion of a rainwater outlet serving as a leading end of a drainage canal formed in a building framework for introducing rainwater in the rainwater inlet, a drain portion for discharging excessive water exceeding a predetermined level to the drainage canal, a reservoir freely fitted into the drainage canal through the rainwater outlet, and a pumping mechanism for pumping water stored in the reservoir to the outside.

5 Claims, 30 Drawing Sheets

RAINWATER CATCHMENT APPARATUS AND PLANT CULTIVATING SYSTEM HAVING RAINWATER CATCHMENT APPARATUS

CROSS REFERENCE TO RELATED APPLICATIONS

This application is the National Stage of International Application No. PCT/JP2008/069772, filed Oct. 30, 2008, and claims benefit of Japanese Application No. 2007-289929, filed Nov. 7, 2007, both of which are herein incorporated by reference in their entirety.

TECHNICAL FILED

The present invention relates to a rainwater catchment apparatus comprising a reservoir for storing rainwater flowing into a rainwater outlet formed in a building framework, and a pumping mechanism for pumping water stored in the reservoir.

BACKGROUND ART

The above-noted rainwater catchment apparatus is adapted to efficiently collect rainwater falling on a roof or rooftop of the building framework (a residential house or building, for example). Rainwater collected can be used in various ways (for watering on a plant or flushing in a toilet, for example).

As the conventional art relating to such a rainwater catchment apparatus, Patent Document 1 has proposed water catchment equipment having the reservoir for collecting rainwater that is provided in the front of the house or building, for example.

[Patent Document 1] Japanese Patent Publication No. 56-38733

DISCLOSURE OF THE INVENTION

When the conventional rainwater catchment apparatus noted above is mounted on an existing building, the water catchment equipment is provided in the front of the building, and thus a new drainage pipe needs to be prepared to transport rainwater from the rainwater outlet to the water catchment equipment, which requires renovation of the building.

On the other hand, when the above-noted rainwater catchment apparatus is mounted on a new-built building, it is required to design the building to adapt the rainwater catchment apparatus to the building, which disadvantageously affects the efficiency in construction of the building.

The present invention has been made having regard to the above-noted circumstances, and the object of the invention is to provide a rainwater catchment apparatus that can be easily mounted without renovating the building.

A first characteristic feature of the present invention lies in a rainwater catchment apparatus comprising:

a rainwater inlet for introducing rainwater;

a flange portion engaged with a peripheral portion of a rainwater outlet serving as a leading end of a drainage canal formed in a building framework for introducing rainwater into the rainwater inlet;

a drain portion for discharging excessive water exceeding a predetermined level to the drainage canal;

a reservoir freely fitted into the drainage canal through the rainwater outlet; and a pumping mechanism for pumping water stored in the reservoir to the outside.

[Function and Effect]

The rainwater catchment apparatus of the present invention can be easily mounted on the existing rainwater outlet of the building without renovating the building.

More particularly, in installing the rainwater catchment apparatus of the present invention, it is only required that the reservoir be fitted into the rainwater outlet to engage the flange portion with the peripheral portion of the rainwater outlet.

Rainwater flowing into the rainwater outlet flows over the flange portion into the rainwater inlet and is stored in the reservoir. The stored rainwater is pumped by the pumping mechanism of the present invention to be used in various ways (watering on a plant or flushing in a toilet, for example).

According to the present invention, even if a large amount of water flows into the reservoir due to heavy rain, excessive water exceeding a predetermined level of the reservoir is discharged from the drain portion to the drainage canal. Thus, there is no concern that water would overflow the rainwater outlet of the building to flood the rooftop or the like.

A second characteristic feature of the present invention lies in that the pumping mechanism includes a draw-up pump for pumping water stored in the reservoir, and a pumping tube through which water flows pumped by the draw-up pump.

[Function and Effect]

Since the pumping mechanism in the rainwater catchment apparatus of the present invention includes a draw-up pump for pumping water stored in the reservoir, and a pumping tube through which water flows pumped by the draw-up pump, water stored in the reservoir is efficiently pumped and is used more easily.

A third characteristic feature of the present invention lies in that the rainwater inlet is provided with a filter portion for removing solid substances contained in rainwater.

[Function and Effect]

According to the rainwater catchment apparatus of the present invention, the rainwater inlet is provided with a filter portion for removing solid substances contained in rainwater, which prevents a capacity of the reservoir from being reduced, or prevents water to be stored from being reduced, by accumulation of solid substances. Moreover, more cleaned water with solid substance being removed can be used.

The characteristic feature of a plant cultivating system in accordance with the present invention lies in comprising:

the rainwater catchment apparatus;

a plant cultivating apparatus; and a water-supply mechanism for supplying water pumped by the rainwater catchment apparatus to the plant cultivating apparatus.

[Function and Effect]

With the plant cultivating system of the present invention, a watering operation is simplified to cultivate the plant efficiently.

BEST MODE FOR CARRYING OUT THE INVENTION

Embodiments of the present invention will be set forth hereinafter in reference to the accompanying drawings.
<Mode for Carrying Out the Invention>

Figure 1:
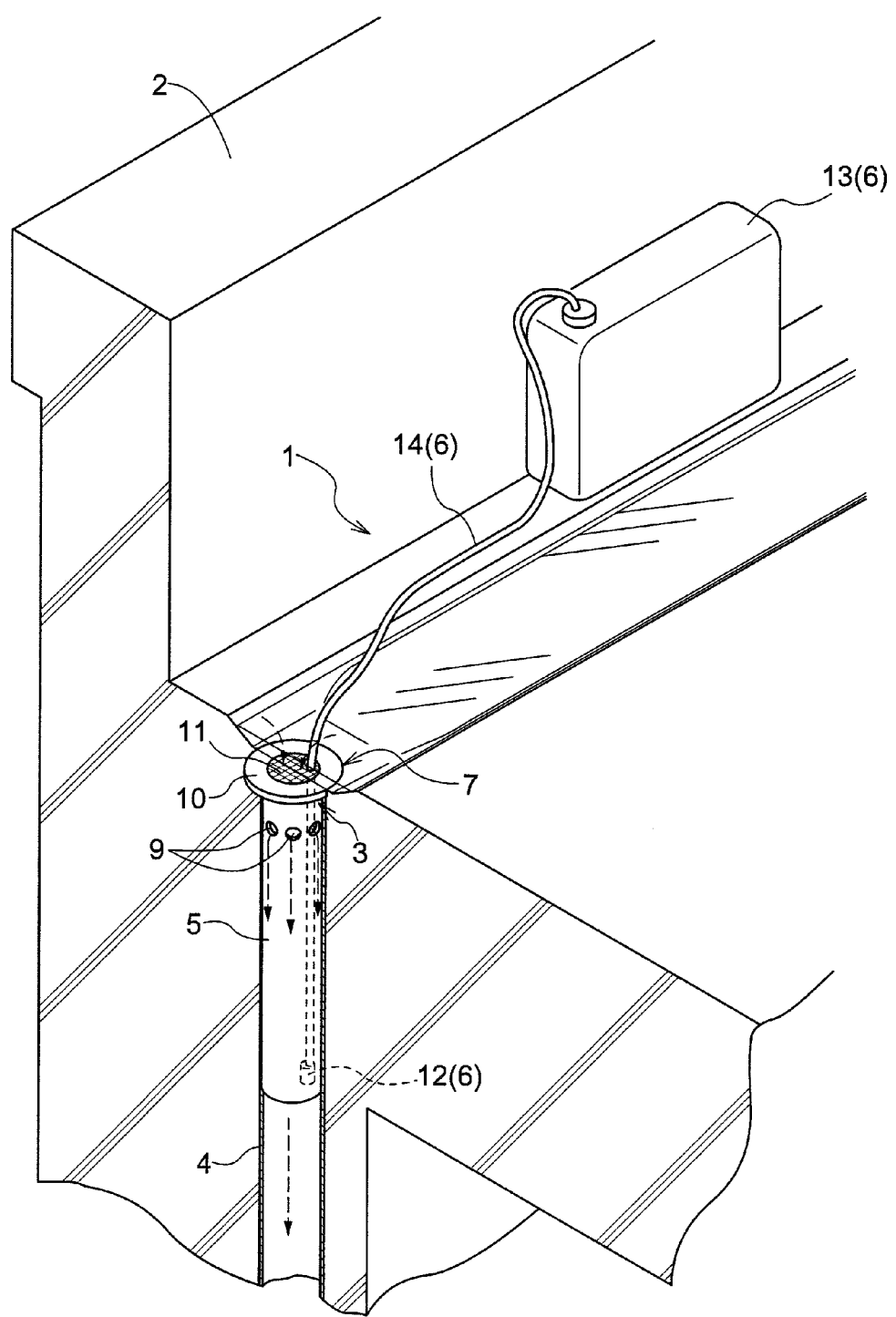
FIG. 1 is a perspective view schematically showing a condition in which a rainwater catchment apparatus of the present invention is provided in a rainwater outlet formed in a building framework.
Figure 2:
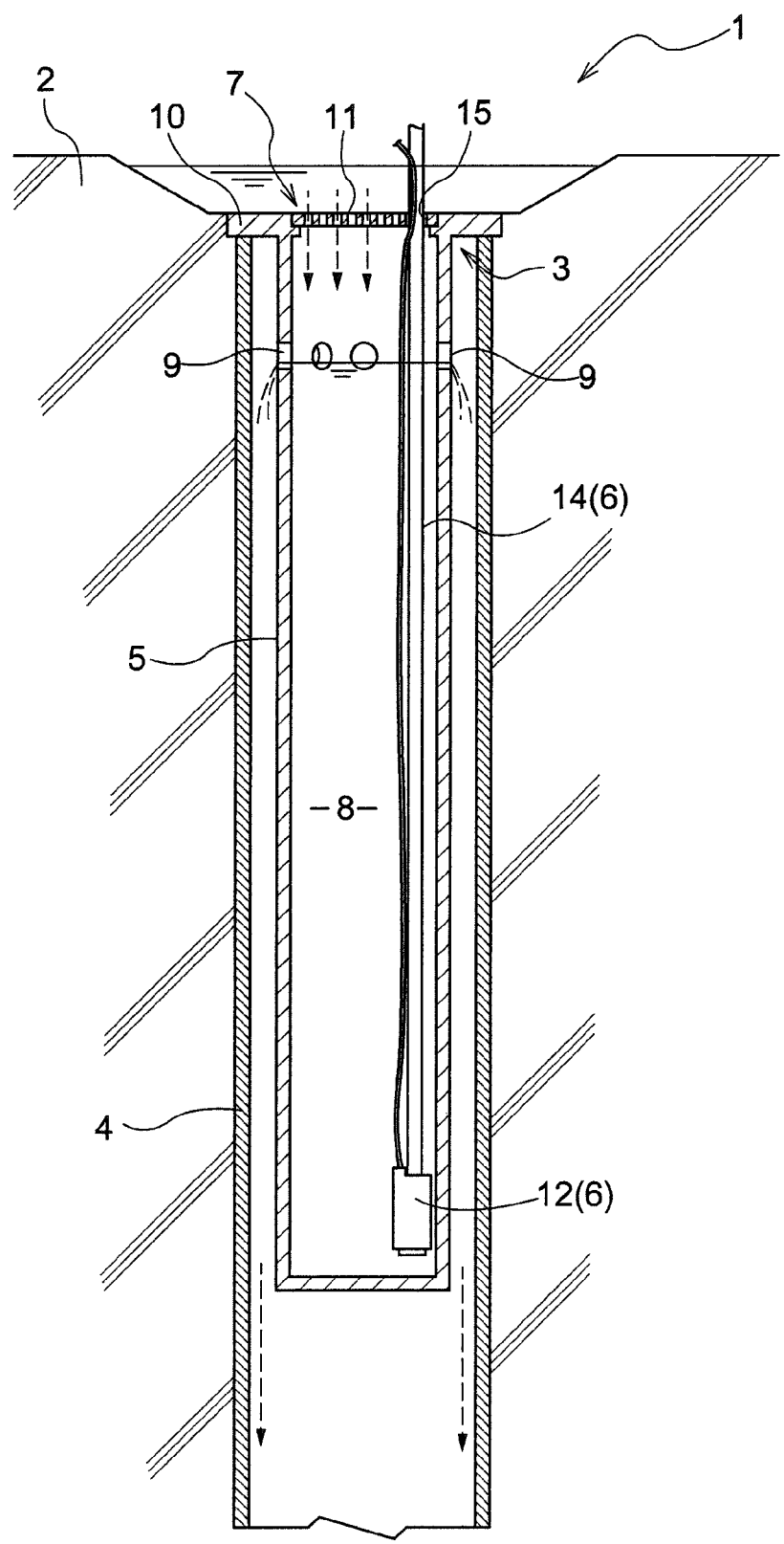
FIG. 2 is a sectional view schematically showing the condition in which the rainwater catchment apparatus of the present invention is provided in the rainwater outlet formed in the building framework.

FIGS. 1 and 2 each schematically show a condition in which a rainwater catchment apparatus 1 is provided in a rooftop of a building framework 2 such as a residential house or a building (FIG. 1 is a perspective view; FIG. 2 is a sectional view). Arrows shown in broken line in FIGS. 1 and 2 indicate a flowing direction of rainwater.

Figure 3:
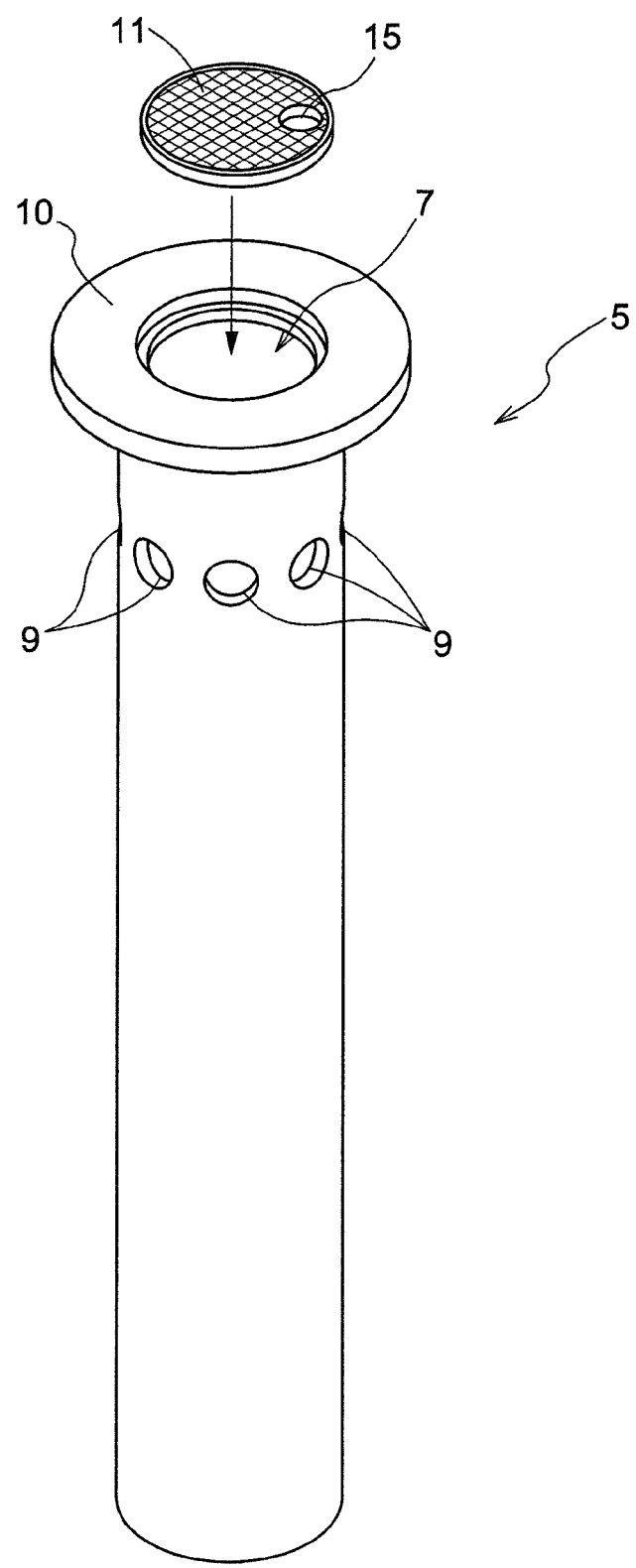
FIG. 3 is a perspective view of a reservoir in the rainwater catchment apparatus of the present invention.

FIG. 3 is a perspective view of a reservoir 5 in the rainwater catchment apparatus 1 of the present invention.

The rainwater catchment apparatus 1 of the present invention comprises the reservoir 5 for storing rainwater flowing into a rainwater outlet 3 serving as a leading end of a drainage canal 4, and a pumping mechanism 6 for pumping stored water.

(Reservoir)

As shown in FIGS. 1 to 3, the reservoir 5 includes a rainwater inlet 7 for introducing rainwater, a water-storage portion 8 for storing rainwater introduced, a drain portion 9 for draining off excessive water exceeding a predetermined level to the drainage canal 4 by overflow, and a flange portion 10 engaged with a peripheral edge of the rainwater outlet 3 for introducing rainwater into the rainwater inlet 7. The reservoir 5 is fitted into the drainage canal 4 through the rainwater outlet 3.

In the current mode, a filter portion 11 is provided in the rainwater inlet 7 for removing solid substances contained in rainwater. The filter portion, however, is not intended to limit the construction of the present invention, but may be provided as necessary.

It also should be noted that water to be stored in the reservoir 5 is not limited to rainwater, and any water having a chance to flow into the rainwater outlet 3 may be included.

(Pumping Mechanism)

A pumping mechanism of the present invention is not limited to any particular construction as long as it is capable of pumping water stored in the reservoir. Typically, the pumping mechanism may include a draw-up pump for pumping water stored in the reservoir and a pumping tube through which water pumped by the draw-up pump flows.

As shown in FIGS. 1 and 2, the pumping mechanism 6 in the current mode includes a draw-up pump 12 for pumping water stored in the water-storage portion 8, a water-storage tank 13 provided on the roof or rooftop of the building framework 2, and a pumping tube 14 allowing the draw-up pump 12 to communicate with the water-storage tank 13.

When it rains, rainwater flowing into the rainwater outlet 3 flows over the flange portion 10 and enters the rainwater inlet 7 to be stored in the water-storage portion 8. Rainwater stored in the water-storage portion 8 is pumped by the draw-up pump 12 to the water-storage tank 13 through the pumping tube 14 for storage. Rainwater stored in the water-storage tank 13 can be used in various ways (for watering on a plant or flushing in a toilet, for example).

(How to Install)

Next, the outline of the way of installing the rainwater catchment apparatus 1 will be described hereinafter.

In order to install the rainwater catchment apparatus 1 in the building framework 2, the reservoir 5 is firstly fitted into the rainwater outlet 3 acting as the leading end of the drainage canal 4 to engage the flange portion 10 with the peripheral edge of the rainwater outlet 3. In this, the water-storage portion 8 of the reservoir 5 is disposed within the drainage canal 4.

Then, the filter portion 11 is attached to the rainwater inlet 7.

Finally, the draw-up pump 12 (the pumping tube 14 is attached to the draw-up pump 12 for communicating with the water-storage tank 13) is inserted through an insert inlet 15 formed in the filter portion 11 to be placed in a bottom portion of the reservoir 5.

(Modified Mode)

Figure 4:
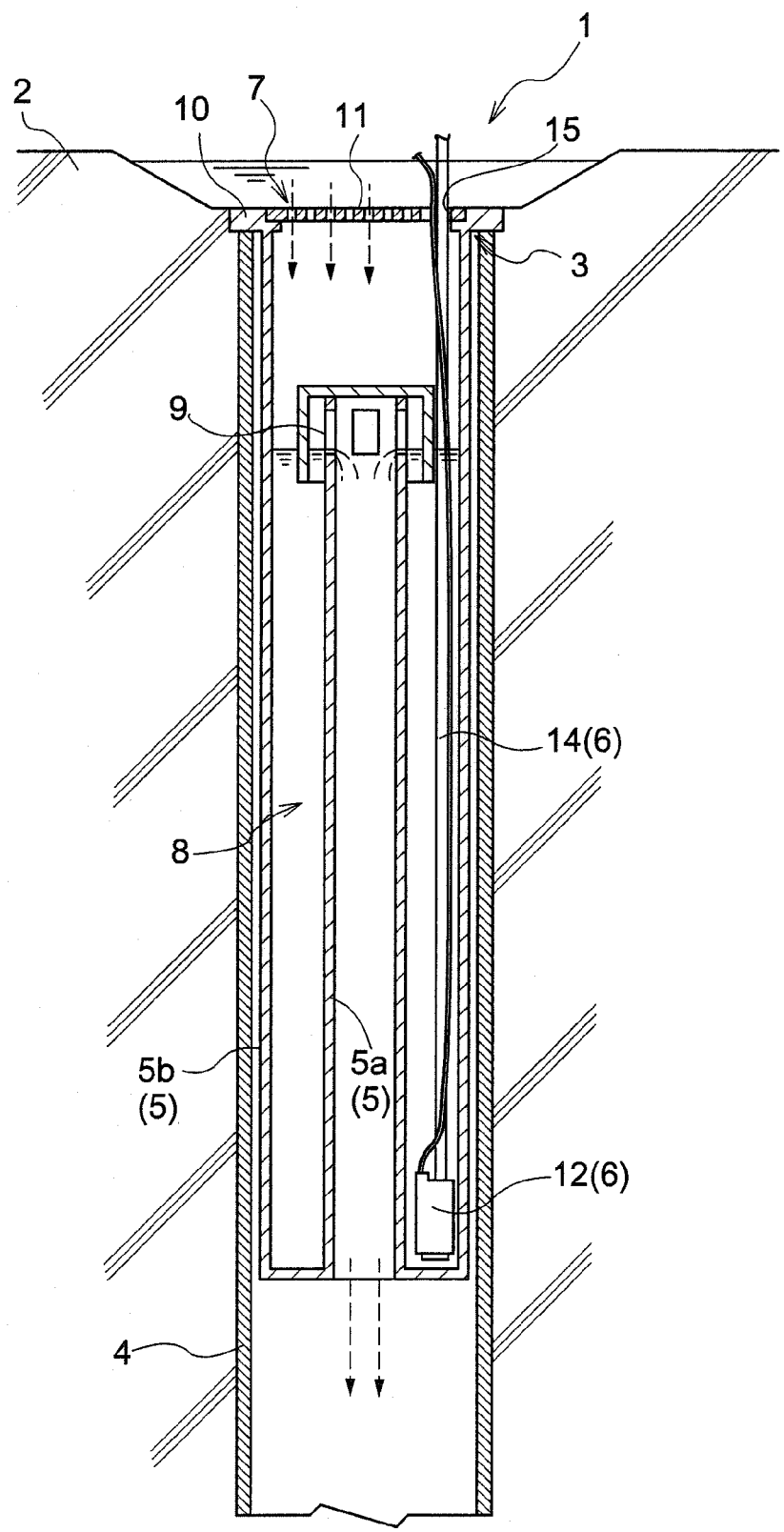
FIG. 4 is a sectional view schematically showing the condition in which the rainwater catchment apparatus of the present invention (modified mode) is provided in the rainwater outlet formed in the building framework.

FIG. 4 is a sectional view schematically showing the rainwater catchment apparatus 1 in accordance with a modified mode of the present invention. It should be noted that the components having like functions are assigned the like reference numbers to omit repetitious explanation thereof and only the aspects that defer from the above-noted mode will be explained.

As shown in FIG. 4, the reservoir 5 in the current mode includes an inner tubular portion 5a formed in the interior thereof. The water-storage portion 8 is disposed between the inner tubular portion 5a and an outer tubular portion 5b while the drain portion 9 is disposed in the inner tubular portion 5a.

Further, according to the current mode, excessive water exceeding the predetermined level of the reservoir 5 overflows the drain portion 9 to be discharged to the drainage canal 4 through the inner tubular portion 5a.

(Other Modified Modes)

1. Various sensors (a level sensor, for example) may be provided within the reservoir in the rainwater catchment apparatus of the present invention.

2. The reservoir in the rainwater catchment apparatus of the present invention may be bellows-shaped. Such a reservoir may be easily attachable when the drainage canal disposed within the outlet is a bent pipe.

EMBODIMENTS

Embodiments of a rainwater catchment apparatus 1 of the present invention will be described hereinafter.

Water collected by the rainwater catchment apparatus 1 of the present invention may be used in plant cultivation, for example, (that is to say, used in watering). A combination of the rainwater catchment apparatus 1 of the present invention and an appropriate plant cultivating apparatus easily forms a plant cultivating system which may simplify a watering operation to cultivate a plant effectively.

First Embodiment

Figure 5:
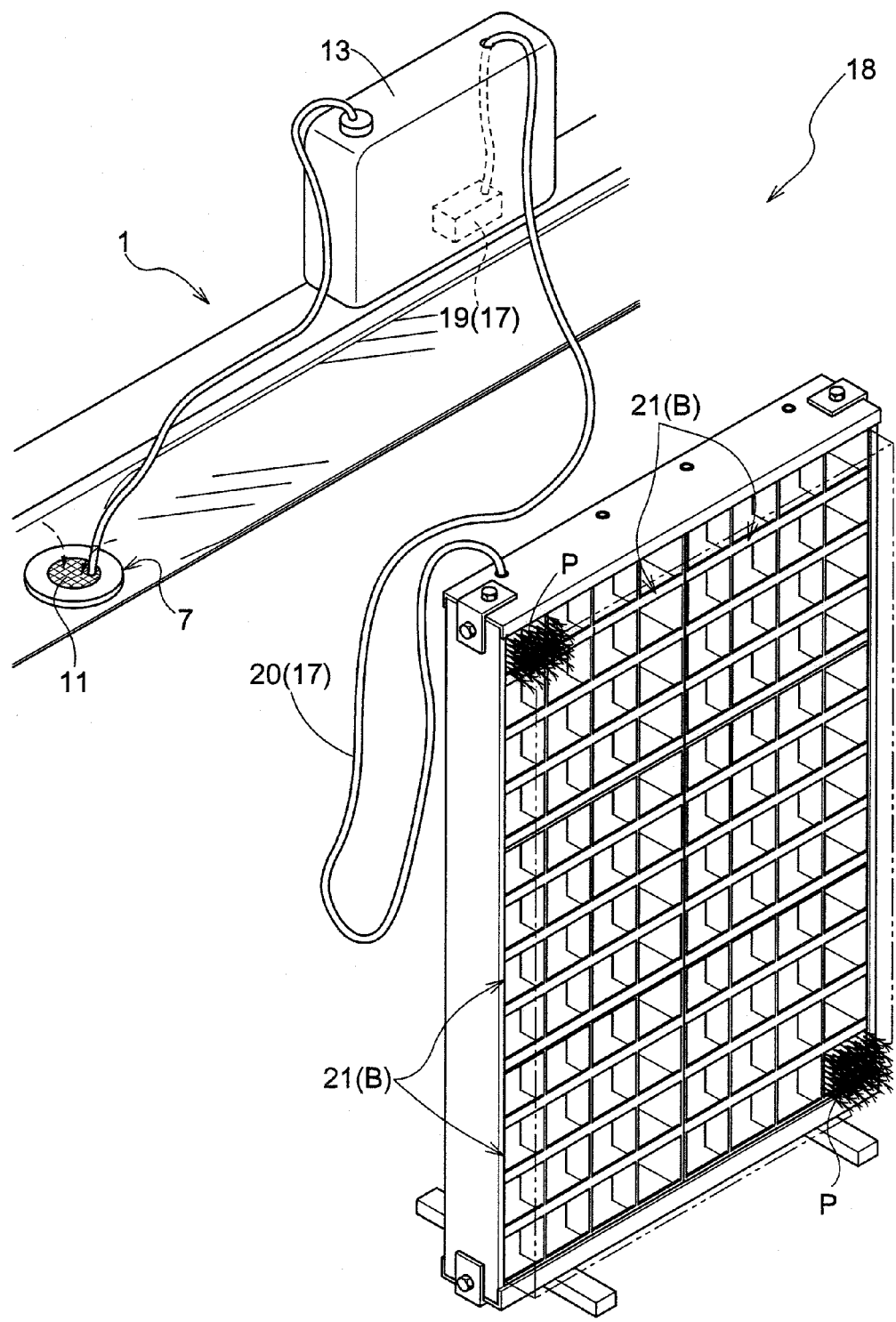
FIG. 5 schematically shows a plant cultivating system comprising the rainwater catchment apparatus of the present invention in combination with a plant cultivating apparatus.

FIG. 5 schematically shows a plant cultivating system 18 comprising a rainwater catchment apparatus 1 of the present invention in combination with a plant cultivating apparatus.

The plant cultivating system 18 comprises the rainwater catchment apparatus 1, the plant cultivating apparatus for cultivating the plant, and a water-supply mechanism 17 for supplying water pumped by the rainwater catchment apparatus 1 to the plant cultivating apparatus.

In the plant cultivating system 18, water stored in the water-storage tank 13 of the rainwater catchment apparatus 1 is automatically supplied to the plant cultivating apparatus through the water-supply mechanism 17.

In particular, when the plant cultivating system 18 is used in a rooftop of a building, for example, it is possible to arrange the rainwater catchment apparatus 1 and the plant cultivating apparatus in proximity to each other, which can save working energy in the pumping mechanism 6 or the water-supply mechanism 17 of the rainwater catchment apparatus 1.

The water-supply mechanism 17 and the plant cultivating apparatus in the current embodiment will be described in detail hereinafter.

(Water-Supply Mechanism)

The water-supply mechanism 17 includes a water-supply pump 19 for feeding water stored in the water-storage tank 13 to the plant cultivating apparatus, and a water-supply tube 20 (hose, for example) for allowing the water-supply pump 19 to communicate with the plant cultivating apparatus.

(Plant Cultivating Apparatus)

Figure 6:
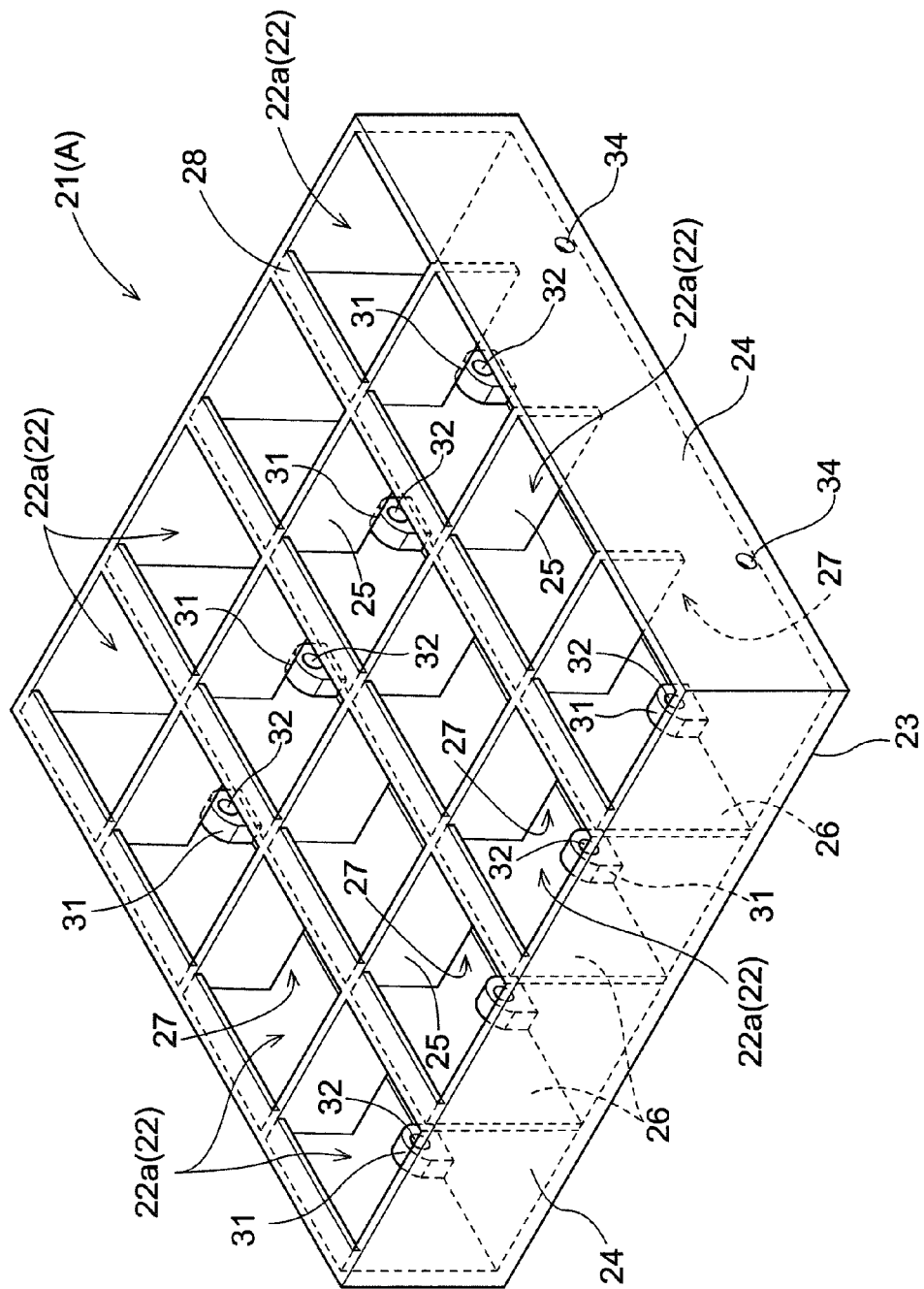
FIG. 6 is a perspective view of the plant cultivating apparatus in a horizontal posture.
Figure 7:
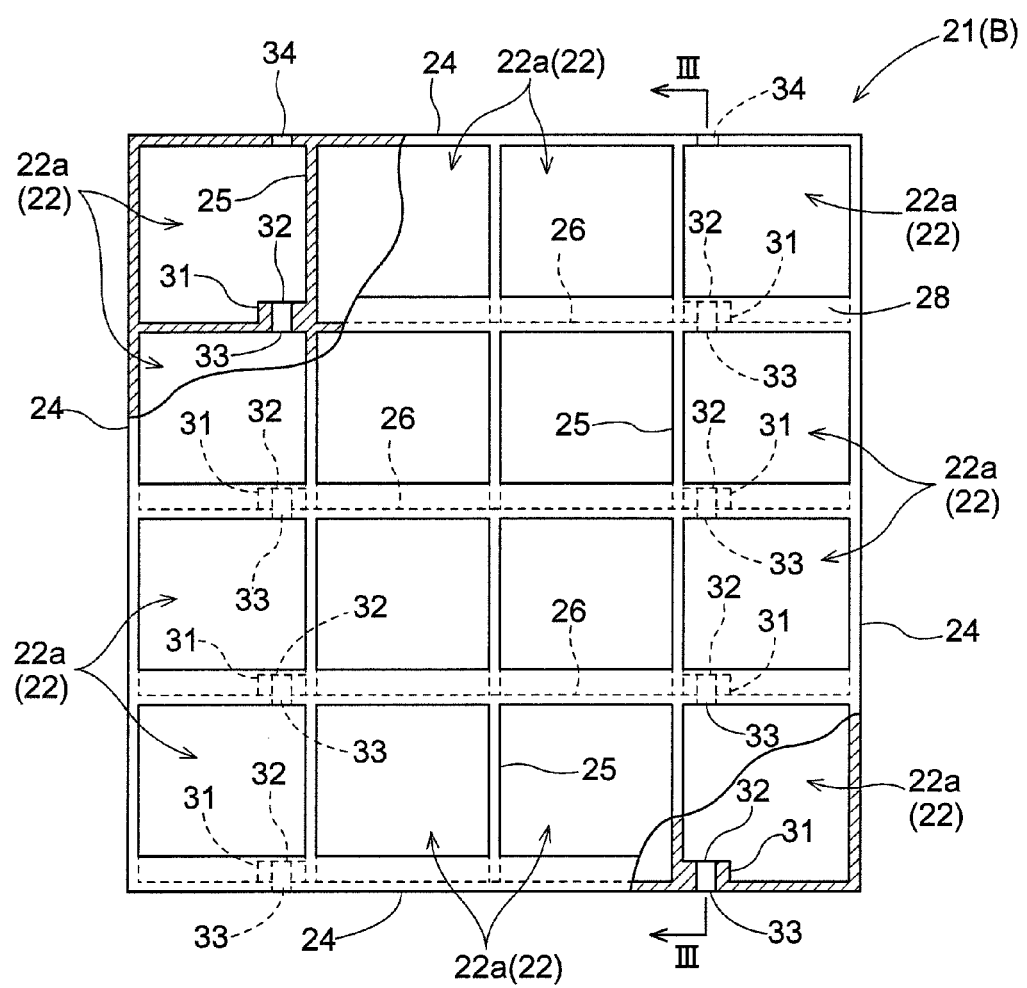
FIG. 7 is a partially cut-away front view of the plant cultivating apparatus in a vertical posture.
Figure 8:
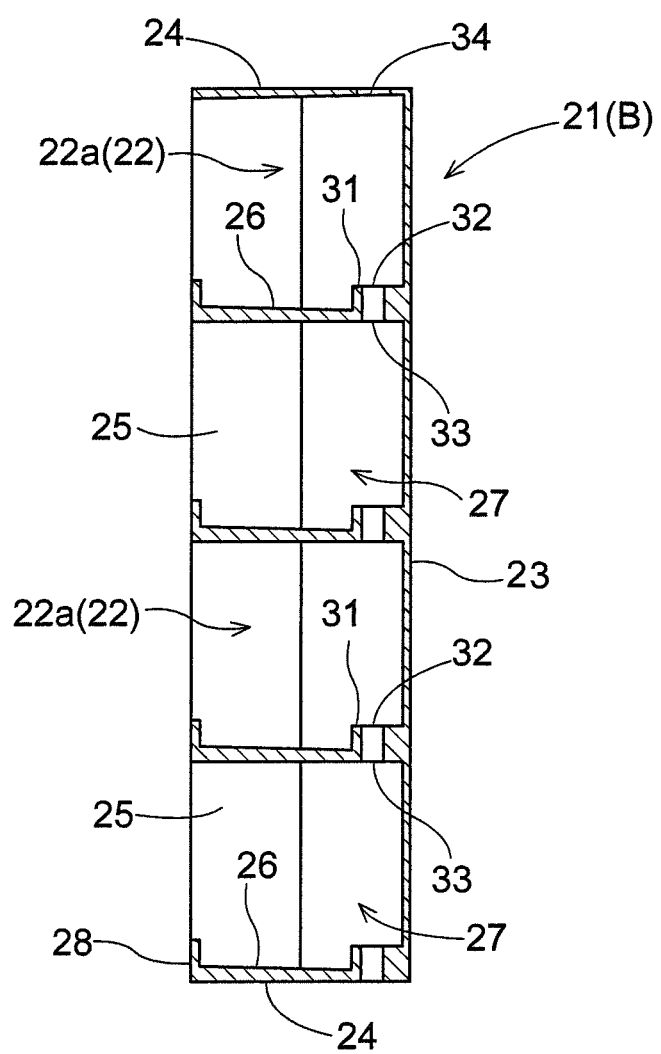
FIG. 8 is a sectional view taken on line III-III in FIG. 2.

As shown in FIGS. 6 to 8, the plant cultivating apparatus includes a container body 21 that is rectangular and made of synthetic resin, for example. The container body 21 has a bottom wall 23 and four side walls 24 mounted upright from four sides of the bottom wall 23 to define a planting space 22 for cultivating the plant P (see FIGS. 9 to 11).

Referring to FIG. 7, the planting space 22 of the container body 21 is sectioned by partition walls 25 extending vertically and computing walls 26 extending horizontally into numeral planting space units 22a. More particularly, in the current embodiment, the planting space is sectioned into sixteen planting space units 22a by three partition walls 25 and three computing walls 26. The partition walls 25 each have a communicating opening 27 for planting water W (see FIGS. 9 and 10). Further, four upper walls 28 are continuously formed between the lateral side walls 24 to cover part of the top of the planting space units 22a.

Figure 9:
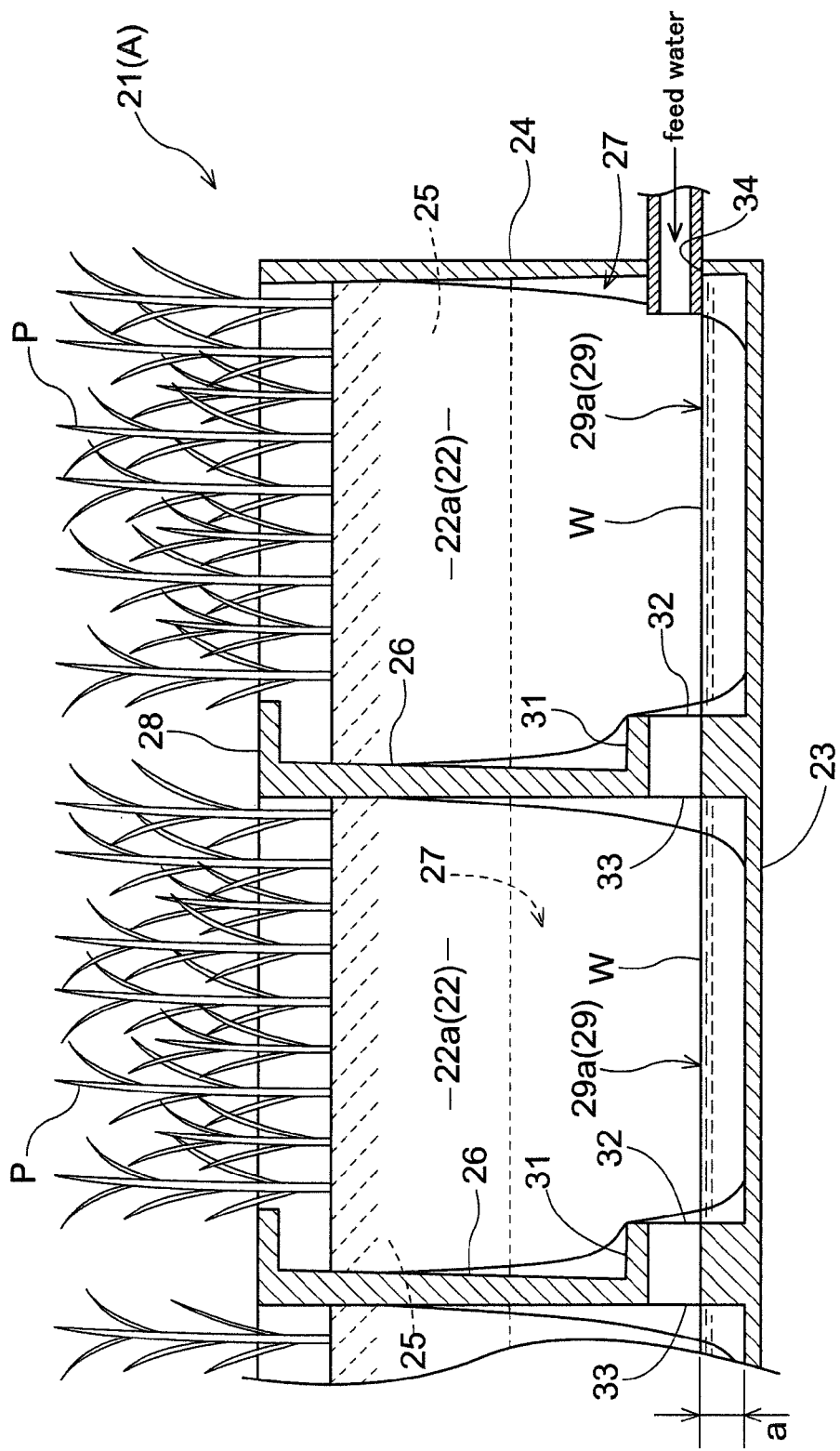
FIG. 9 is a sectional view of a principal portion of the plant cultivating apparatus in the horizontal posture.
Figure 10:
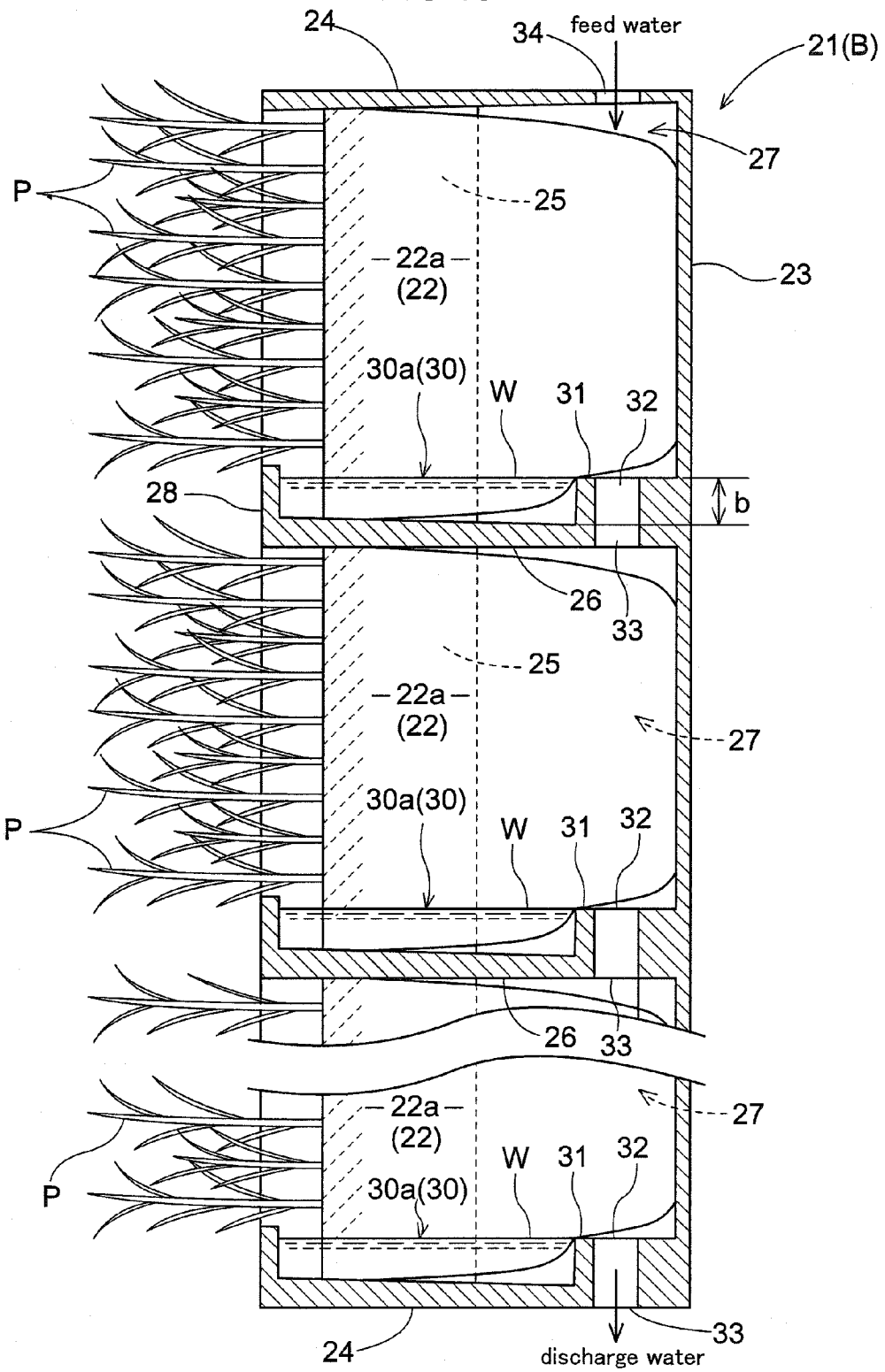
FIG. 10 a sectional view of the principal portion of the plant cultivating apparatus in the vertical posture.

In a horizontal posture A of the container body 21 shown in FIG. 6 in which the planting space 22 is oriented upward, the bottom wall 23 and side walls 24 of the container body 21 forms a horizontal water-storage portion 29 for storing planting water (rainwater) W, as shown in FIG. 9. In a vertical posture B of the container body 21 shown in FIGS. 7 and 8 in which the planting space 22 is orientated sideways, the bottom wall 23, side walls 24, comparting walls 26 and upper walls 28 form a vertical water-storage portion 30 for storing planting water W as shown in FIG. 10.

In the current embodiment, sixteen horizontal water-storage units 29a are formed by the bottom wall 23, side walls 24, partition walls 25, and comparting walls 26 in the horizontal posture A of the container body 21. The four horizontal water-storage units 29a arranged in a horizontal direction are communicated with each other through the communicating openings 27.

On the other hand, sixteen vertical water-storage units 30a are formed by the bottom wall 23, side walls 24, partition walls 25, comparting walls 26, and upper walls 28 in the vertical posture B of the container body 21. More particularly, the four vertical water-storage units 30a arranged at the bottom in FIG. 7 are formed by the bottom wall 23, side walls 24, partition walls 25, and upper walls 28, while the remaining twelve vertical water-storage units 30a are formed by the bottom wall 23, side walls 24, partition walls 25, comparting walls 26, and upper walls 28. The four vertical water-storage units 30a arranged in the horizontal direction are communicated with each other through the communicating openings 27.

Overflow tubular members 31 are provided in the horizontal water-storage portion 29 and the vertical water-storage portion 30 of the container body 21 for maintaining planting water W stored in the water-storage portions 29 and 30 in a constant level or below. Each overflow tubular member 31 has one opening end serving as the overflow outlet 32 while the other opening end serving as a drain outlet 33.

More particularly, referring to FIG. 7, the tubular member 31 in this embodiment are provided in the eight planting space units 22a, the four planting space units 22a arranged at the left side and the four planting space units 22a arranged at the right side. The overflow outlet 32 in each tubular member 31 has a leading end located at a position remote from the bottom wall 23 of the container body 21 by a predetermined distance "a" toward the upper wall 28 in the horizontal posture A shown in FIG. 9 while located at a position remote from the side wall 24 or the computing wall 26 of the container body 21 by a predetermined distance "b" toward the interior of each planting space unit 22a in the vertical posture B shown in FIG. 10. The adjacent planting space units 22a are communicated with each other through the overflow outlet 32 and the drain outlet 33 of the tubular member 31. Two of the side tubular members 31 arranged at the bottom in FIG. 7 each include the drain outlet 33 that is open to the side wall 24. Further, the side wall 24 opposing to the side wall forming the drain outlets is provided with two feed-water inlets 34.

It should be noted that the predetermined distances "a" and "b" may be the same or different from each other.

Next, how to use the plant cultivating apparatus will be described hereinafter.

When used in a relatively flat surface such as a veranda, for example, the container body 21 is placed in the horizontal posture A as shown in FIGS. 6 and 9 to accommodate a planting bed or planting soil on the market within each planting space unit 22a for cultivating the plant P. Planting water W may be supplied through the water-supply tube 20 (hose, for example) above the planting space 22 that is open upward, or may be supplied through the feed-water inlet 34 connected to the water-supply tube 20 (hose, for example) as shown in FIG. 9.

When water is supplied from the feed-water inlet 34, for instance, planting water W is firstly supplied to the right-most four planting space units 22a arranged in the horizontal direction in FIG. 9 since those four units 22a are communicated with each other through the communicating openings 27. When planting water W substantially reaches the level of "a" measured from the bottom wall 23, it flows out of the overflow outlet 32 of the tubular member 31 through the drain outlet 33 into the adjacent left planting space unit 22a shown in FIG. 9, and eventually into all the planting space units 22a.

Here, the leading end of the overflow outlet 32 is remote from the bottom wall 23 by the predetermined distance "a" toward the upper wall 28, which allows planting water W to be maintained substantially in the level of "a" which corresponds to the distance remote from the bottom wall 23 or below in each planting space unit 22a. Thus, the horizontal water-storage portion 29a is defined by a part at the level of "a" or below.

On the other hand, when used in a relatively vertical surface such as a retaining wall, for example, the container body 21 is placed in the horizontal posture B as shown in FIGS. 7, 8 and 10 to accommodate the planting bed or planting soil on the market within each planting space unit 22a for cultivating the plant P. Similarly, planting water W may be supplied through the water-supply tube 20 (hose, for example) to the planting space 22 that is open sideways, or may be supplied through the feed-water inlet 34 connected to the water-supply tube 20 (hose, for example).

When water is supplied from the feed-water inlet 34, for instance, planting water W is firstly supplied to the upper-most four planting space units 22a in FIG. 10 and stored in the vertical water-storage units 30a. When planting water W substantially reaches the level of "b" measured from the computing wall 26, it flows out of the overflow outlet 32 of the tubular member 31 through the drain outlet 33 into the adjacent lower planting space unit 22a shown in FIG. 10, and eventually into all the planting space units 22a. Here, the leading end of the overflow outlet 32 projects upward from the comparting wall 26 or the side wall 24 by the predetermined distance "b", which allows planting water W to be maintained substantially at the level of "b" which corresponds to the distance remote from the comparting wall 26 or the side wall 24, or below in each planting space unit 22a. Thus, the vertical water-storage portion 30a is defined by a part at the level of "b" or below.

In this way, the plant cultivating apparatus may be used with the container body 21 being in the horizontal posture A or in the vertical posture B. The overflow outlet 32 of the tubular member 31 is used in common in both the postures.

While only one container body 21 may be used as the plant cultivating apparatus, a plurality of the container bodies 21 may be used in parallel depending on the area of the veranda or the retaining wall in which the container body 21 is placed. One example of such a mode is shown in FIG. 11.

Figure 11:
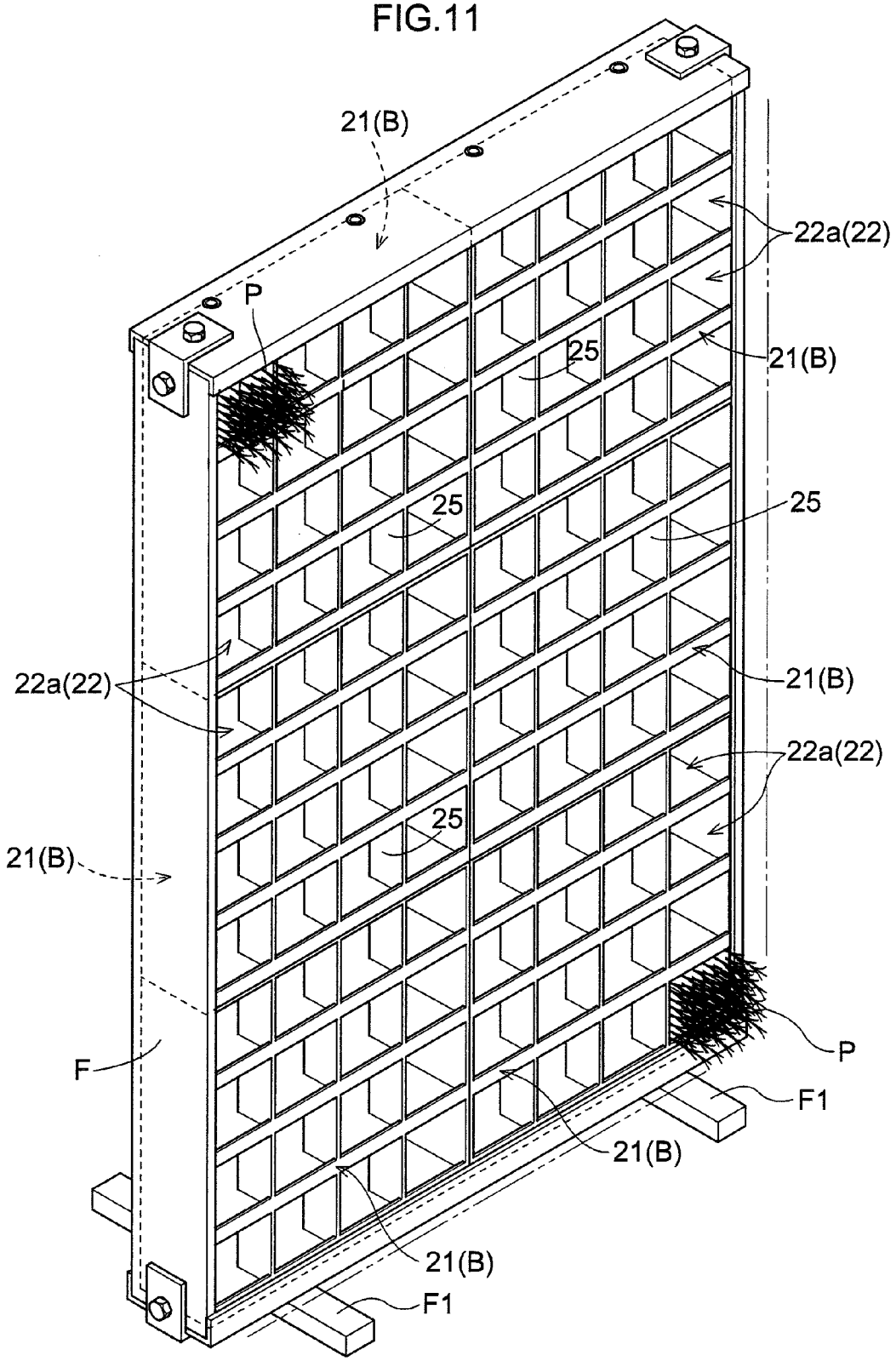
FIG. 11 is a perspective view of the plant cultivating apparatus in the vertical posture.

In this example shown in FIG. 11, six container bodies 21 are arranged in parallel with the planting spaces 22 being oriented in the same direction. With respect to the container bodies 21 adjacent to each other, the overflow outlet 32 of the upper container body 21 is communicated with and connected to the planting space 22 of the lower container body 21 through the drain outlet 33 and the feed-water inlet 34. The whole unit is retained by a frame F having support stands F1.

Next, another mode of the plant cultivating apparatus will be described hereinafter. In order to avoid repetitious descriptions, like reference numbers are assigned to like components that are referred to in the above-noted mode and to the components having the like functions to omit any detailed description. Primarily, only the arrangements which differ from the above-noted mode will be described.

(1) In the above-noted first mode, the planting space 22 is sectioned into the sixteen planting space units 22a by the three partitioned walls 25 and three computing walls 26. Here, the number of the planting space units 22a is not limited to sixteen, but may be two or more.

Figure 12:
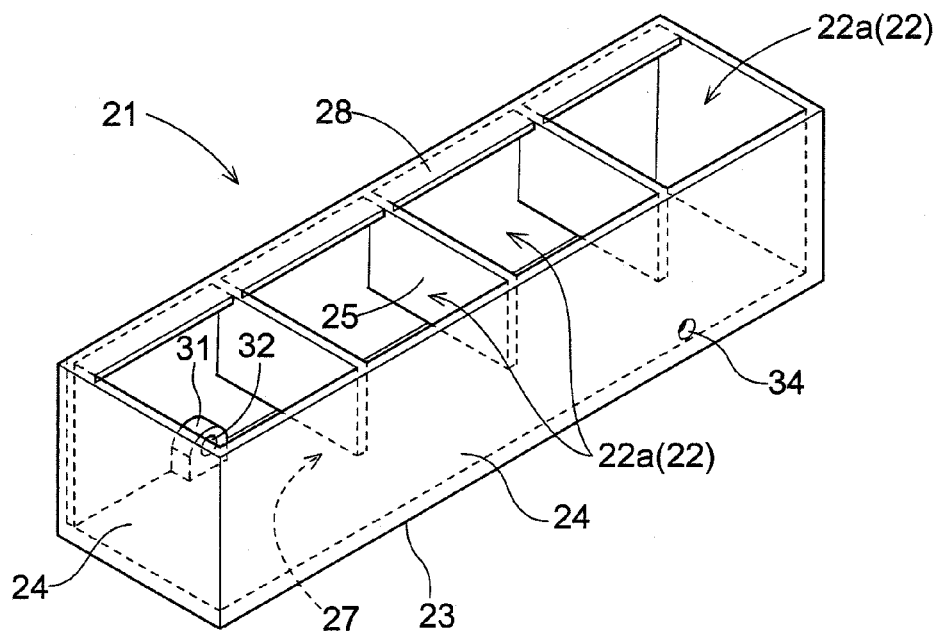
FIG. 12 is a perspective view of the plant cultivating apparatus in the horizontal posture in accordance with another mode.

As shown in FIG. 12, when the planting space 22 is sectioned into the plurality of planting space units 22a, it is also possible to use only the partition walls 25 to form the plurality of planting space units 22a dispensing with the comparting walls 26. In that case, the plurality of planting space units 22a are arranged horizontally in the vertical posture B of the container body 21. The adjacent plating space units 22a communicate with each other through the communicating opening 27 provided in the partition wall 25 for planting water.

In other words, the above-noted mode shows the example in which the planting space 22 is sectioned into numerous planting space units 22a arranged horizontally and vertically in the vertical posture B of the container body 21 by the partition walls 25 and comparting walls 26. FIG. 12 shows the mode in which the container body 21 is formed of only four of the plating space units 22a arranged horizontally in the above-noted mode.

The mode as shown in FIG. 12 provides a single overflow tubular member 31 and a single feed-water inlet 34.

Figure 13:
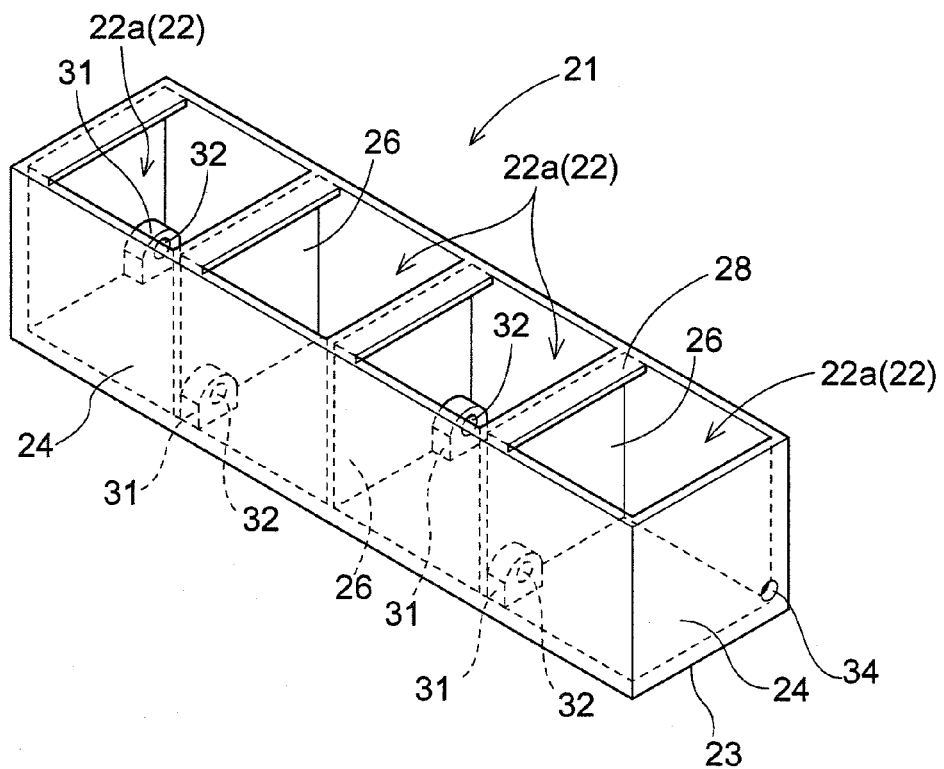
FIG. 13 is a perspective view of the plant cultivating apparatus in the horizontal posture in accordance with the another mode.

As shown in FIG. 13, it is also possible to section the planting space 22 into the plurality of planting space units 22a only by the comparting walls 26 dispensing with the partition walls 25. More particularly, the container body 21 may be formed by only four of the planting space units 22a arranged vertically in the above-noted mode. In that case, the plurality of planting space units 22a are arranged vertically in the vertical posture B of the container body 21. The adjacent plating space units 22a communicate with each other through the overflow outlet 32 provided in the computing wall 26 for planting water.

In the mode shown in FIG. 13, both the overflow outlets 32 and the feed-water inlets 34 are located in the different positions in the planting space units. To be more specific, both the overflow outlets 32 and the feed-water inlets 34 are arranged right and left alternately in the vertical posture B of the container body 21. When the container bodies 21 are connected vertically, the overflow outlet 32 of the upper container body 21 and the feed-water inlet 34 of the lower container body 21 are aligned. Such a construction may be applied to the container body 21 shown in the above-noted mode.

(2) Not being illustrated in particular, a single planting space 22 may be used without being sectioned into the plurality of planting space units 22a. In such a case, the bottom wall 23 and side walls 24 form the planting space 22 and the horizontal water-storage portion 29 while the bottom wall 23, side walls 24, and upper wall 28 form the vertical water-storage portion 30.

Figure 14:
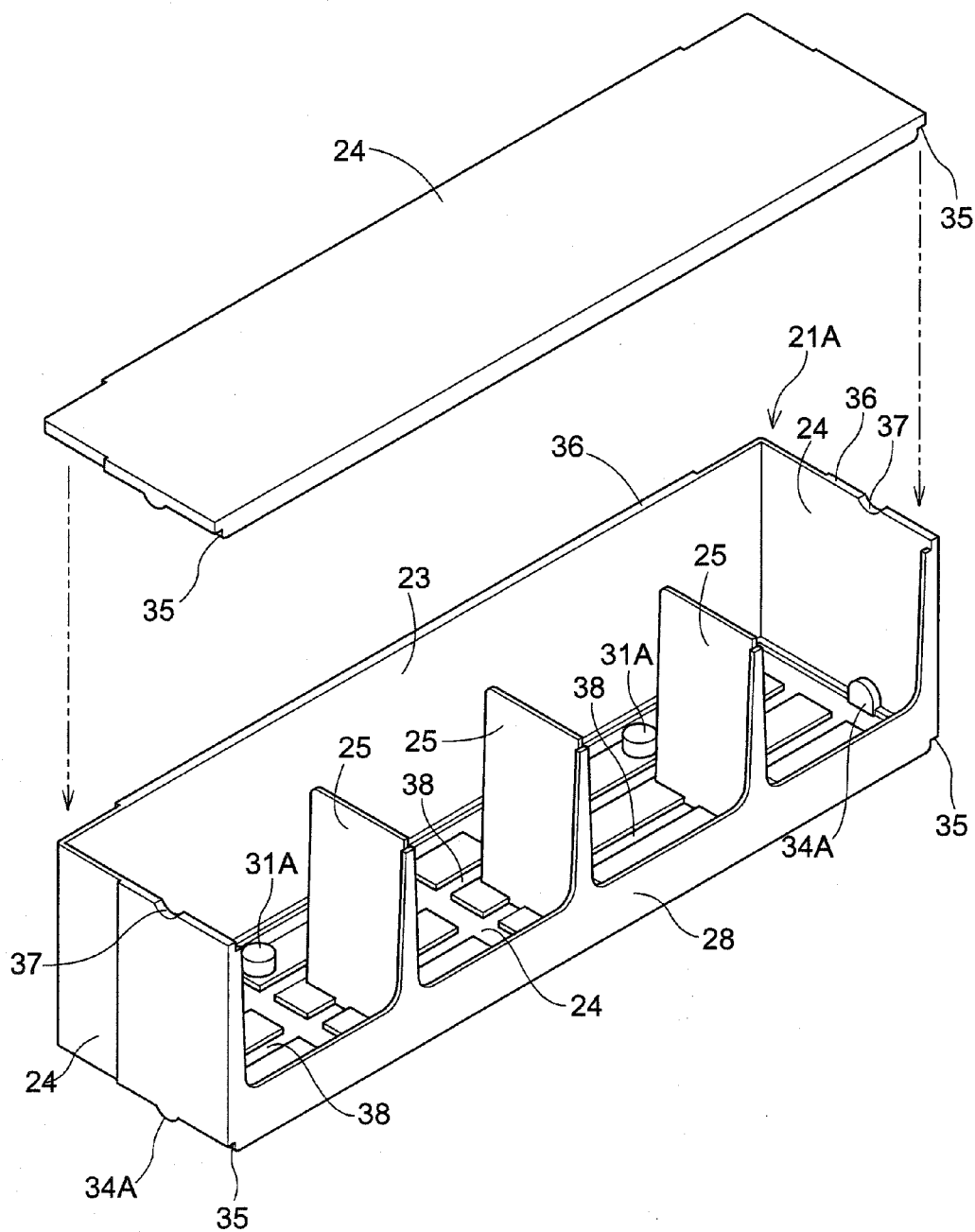
FIG. 14 is an exploded perspective view of the plant cultivating apparatus in accordance with the another mode.
Figure 15:
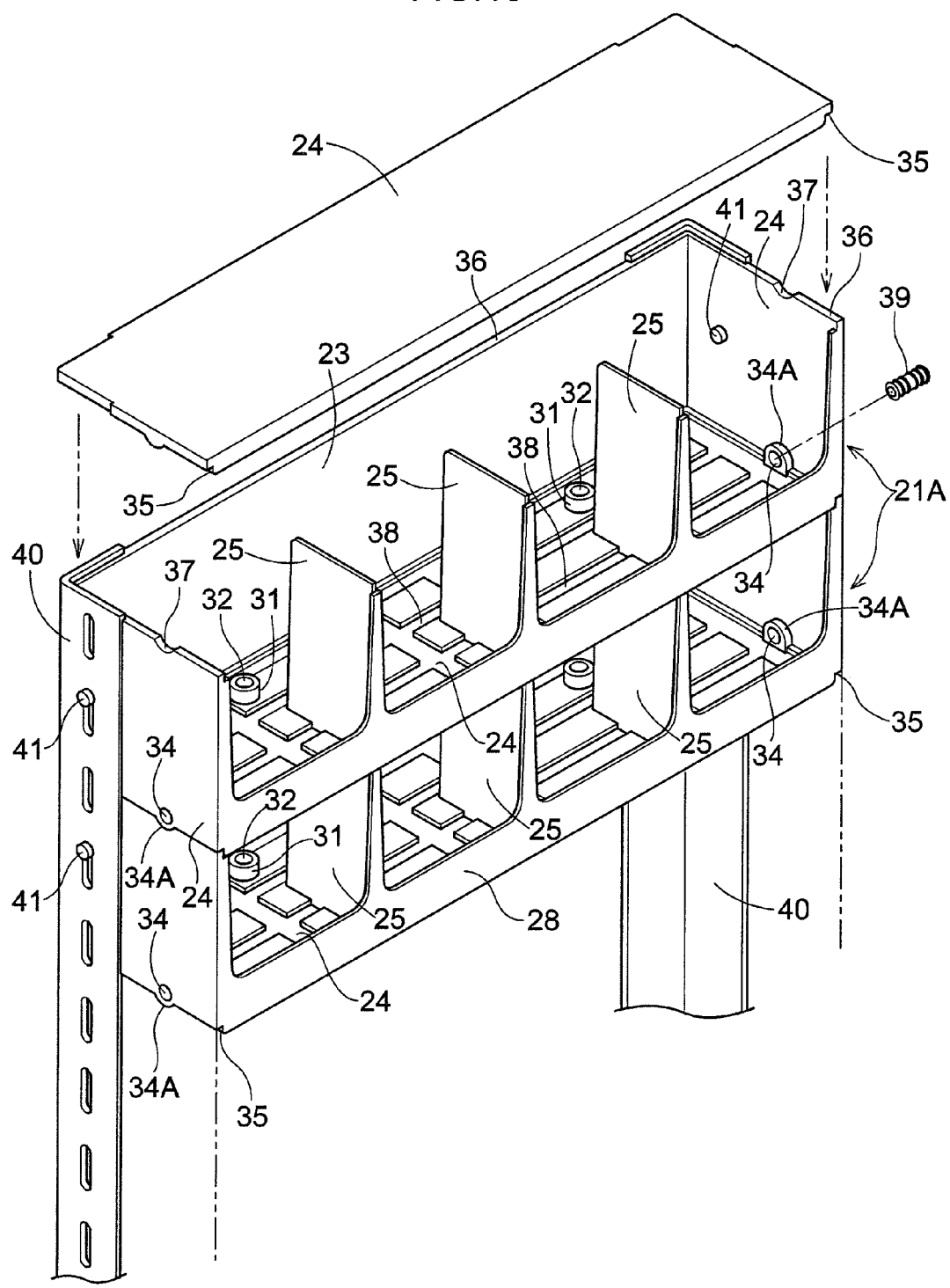
FIG. 15 is a perspective view showing a process of assembling the plant cultivating apparatus in accordance with the another mode.
Figure 16:
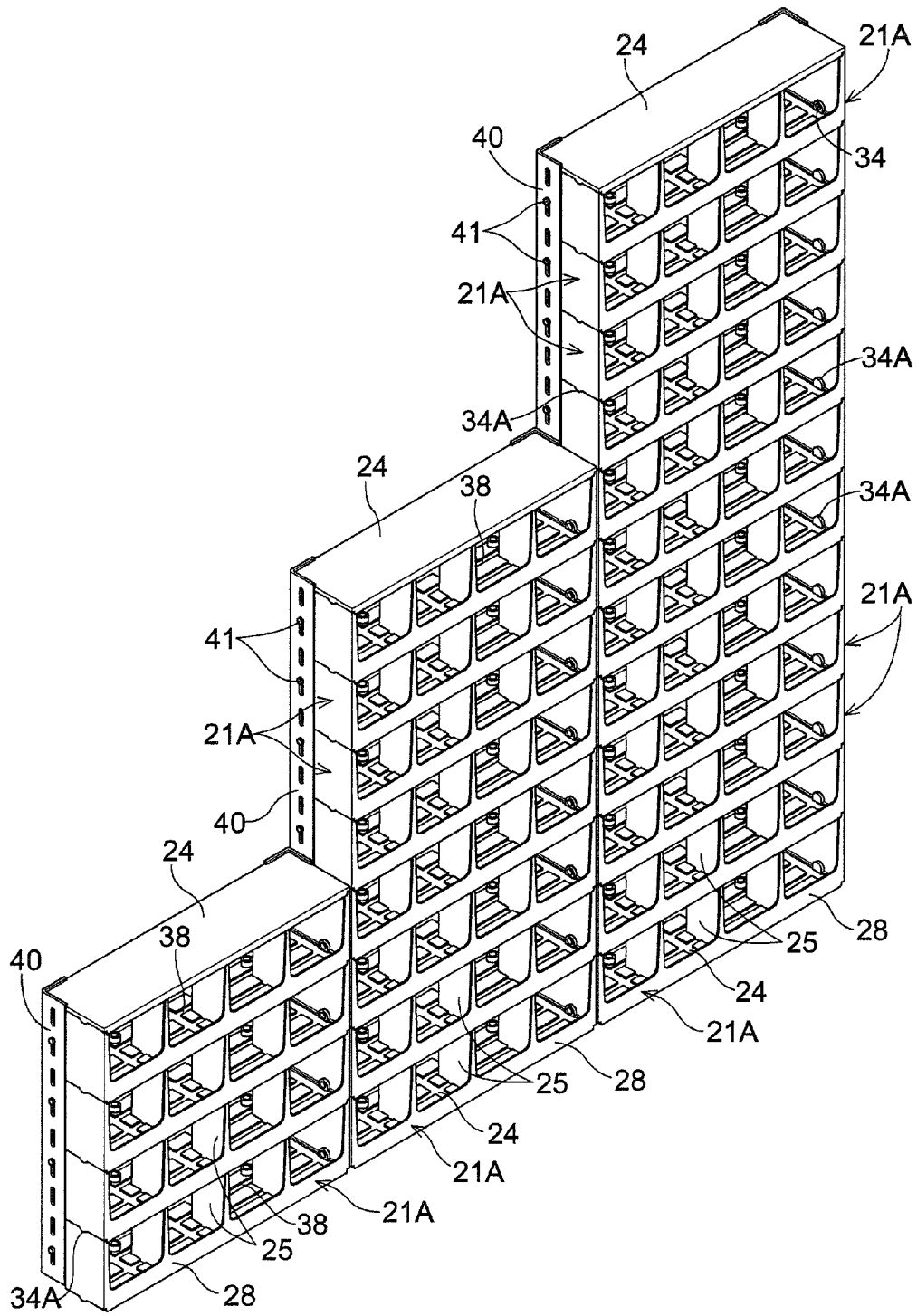
FIG. 16 is a perspective view of an assembly of the plant cultivating apparatus in accordance with the another mode.

(3) So far, the structures of the plant cultivating apparatus have mainly been described. On the other hand, it is also an important subject matter that the plant cultivating apparatus is manufactured as simply as possible and put into market at the low cost. Referring now to FIGS. 14 to 16, a specific method of simply manufacturing the plant cultivating apparatus will be described hereinafter.

FIG. 14 shows a single half-finished product 21A and a single side wall 24 of the container body in the plant cultivating apparatus. The half-finished product 21A of the container body includes the bottom wall 23, three side walls 24 provided upright from three sides of the bottom wall 23, three partition walls 25, and upper wall 28, which are all shown in the above-noted mode. Those walls are integrally formed to provide a one-piece molded product made of synthetic resin.

In other words, the half-finished product 21A shown in FIG. 14 is has a structure which is very similar to the arrangement shown FIG. 12 in that only the side wall 24 positioned at the front side of the container body 21 in the plant cultivating apparatus is removed from the container body 21. A columnar member 31A for forming the overflow tubular member 31 and the overflow outlet 32, and a projection 34A forming the feed-water inlet 34 are integrally formed with the half-finished product 21A.

The side wall 24 provided independently of the half-finished product 21A has stepped portions 35 formed in three sides thereof for engaging the half-finished product 21A. An upper edge 36 of the half-finished product 21A shown in FIG. 14 is adapted to be engaged with the stepped portions 35 of the side wall 24 provided independently. The lower side walls 24 provided in the half-finished product 21A shown in FIG. 14 each have the same stepped portions 35 formed in three sides thereof as the stepped portion 35 of the side wall 24 provided independently.

Numeral 37 in the drawings represents a recess for fittingly receiving the projection 34A while numeral 38 in the drawings represents a recessed groove for facilitating the flow of planting water W.

This half-finished product 21A of the container body is the one-piece molded product made of synthetic resin and thus can be manufactured relatively simply and economically. Needless to say, the side wall 24 has such a simple structure that it is manufactured simply and economically by synthetic resin.

Then, using a single half-finished product 21A and a single side wall 24, for example, the stepped portions 35 of the side wall 24 are engaged with the upper edge 36 of the half-finished product 21A and joined together by using an adhesive as necessary. Then, the columnar member 31A is perforated to form the overflow outlet 32 (see FIG. 15). As a result, the container body 21 for the plant cultivating apparatus as shown in FIG. 12 can be simply manufactured.

Further, as shown in FIGS. 15 and 16, the upper edge 36 of the half-finished product 21A is engaged with the stepped portions 35 of another half-finished product 21A to stack a number of half-finished products 21A serially. Then, the stepped portions 35 of the side wall 24 are engaged with the upper edge 36 of the uppermost half-finished product 21A, thereby providing the plant cultivating apparatus having a desired height. In this, the projection 34A formed in the upper half-finished product 21A fitted into the recess 37 formed in the lower half-finished product 21A. As described above, the columnar member 31A is perforated to form the overflow outlet 32. Further, any of the projections 34A provided in the uppermost half-finished product 21A may be perforated in the bottom wall 23 or the upper side wall 24 in FIG. 15, for example, to form the feed-water inlet 34. A hose connecting element 39 may be attached to the feed-water inlet 34 for connecting the feed-water hose to the container body depending on the case. It is also possible to perforate the left-side projection 34A and the projection 34A of the lower half-finished product 21A for use as the feed-water inlet 34 for the laterally adjacent plant cultivating apparatus (not shown). It should be noted that the right-side projection 34A of the projections 34A in the uppermost half-finished product 21A shown in FIG. 15, for example, may be perforated to form the water-feed inlet 34.

Angled members 40 may be arranged at corners of the stacked numeral half-finished products 21A as necessary. The angled members 40 and the half-finished products 21A are connected to each other by suitable connecting elements 41 to reinforce the plant cultivating apparatus per se, which allows those stacked containers to be arranged in the horizontal direction along the retaining wall, for example.

Second Embodiment

Figure 17:
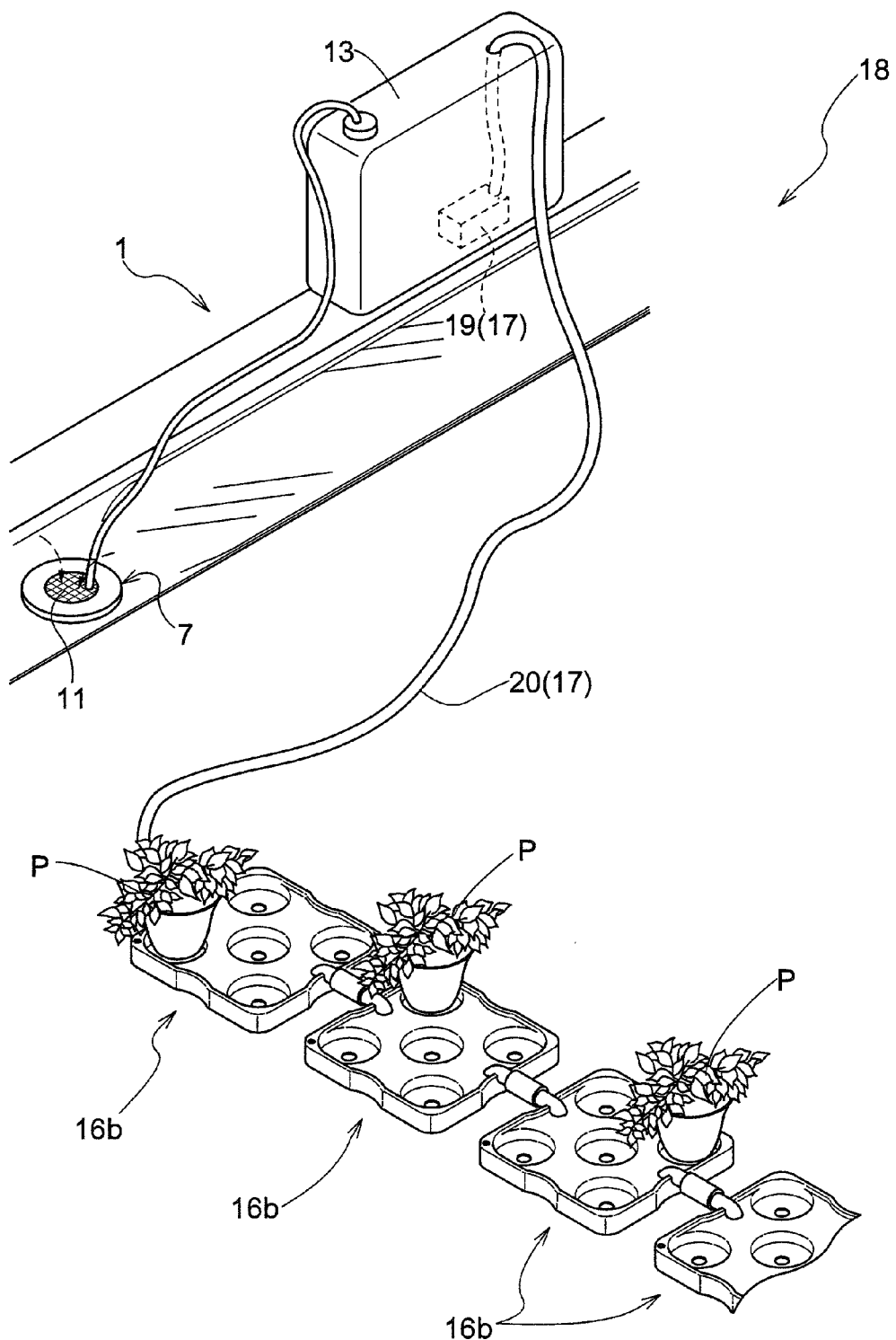
FIG. 17 schematically shows another plant cultivating system comprising the rainwater catchment apparatus of the present invention in combination with a plant cultivating apparatus.

FIG. 17 schematically shows another plant cultivating system 18 different from that of the first embodiment described above. The plant cultivating system 18 comprises the rainwater catchment apparatus 1, the plant cultivating apparatus 16b for cultivating the plant, and the water-supply mechanism 17 for supplying water pumped up by the rainwater catchment apparatus 1 to the plant cultivating apparatus 16b.

In the plant cultivating system 18, water stored in the water-storage tank 13 of the rainwater catchment apparatus 1 is automatically supplied to the plant cultivating apparatus 16b by the water-supply mechanism 17.

In particular, when the plant cultivating system 18 is used in the rooftop of the building, for example, it is possible to arrange the rainwater catchment apparatus 1 and the plant cultivating apparatus in proximity to each other, which can save working energy in the pumping mechanism 6 or the water-supply mechanism 17 of the rainwater catchment apparatus 1.

The water-supply mechanism 17 and the plant cultivating apparatus 16b in the current embodiment will be described in detail hereinafter.

(Water-Supply Mechanism)

The water-supply mechanism 17 includes the water-supply pump 19 for feeding water stored in the water-storage tank 13 to the plant cultivating apparatus 16b, and the water-supply tube 20 (hose, for example) for allowing the water-supply pump 19 to communicate with the plant cultivating apparatus 16b.

(Plant Cultivating Apparatus)

Figure 18:
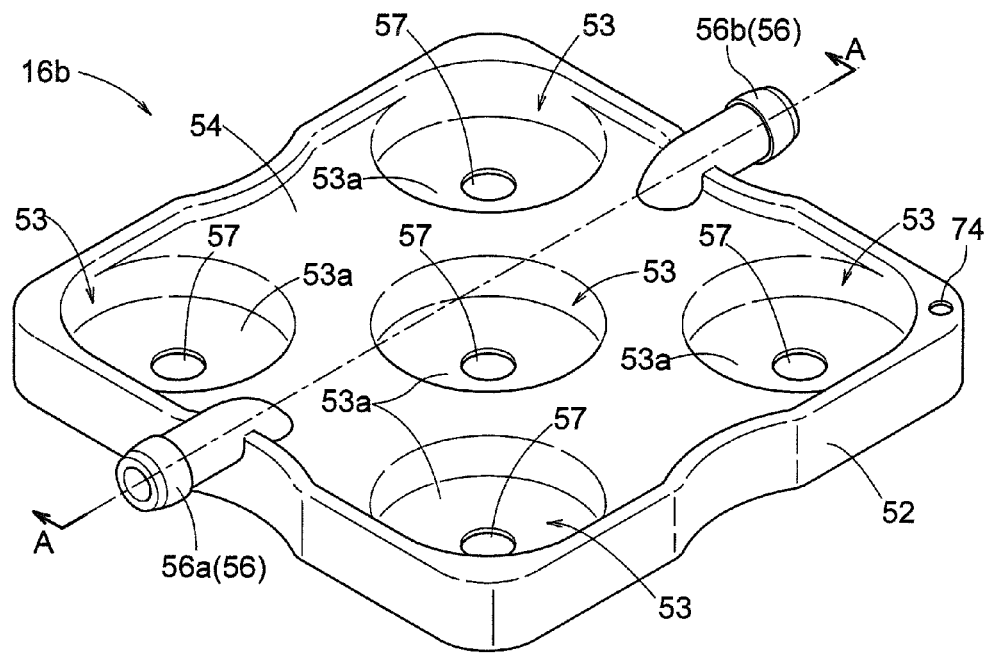
FIG. 18 is a perspective view showing an external appearance of a front side of the plant cultivating apparatus (first using mode)
Figure 19:
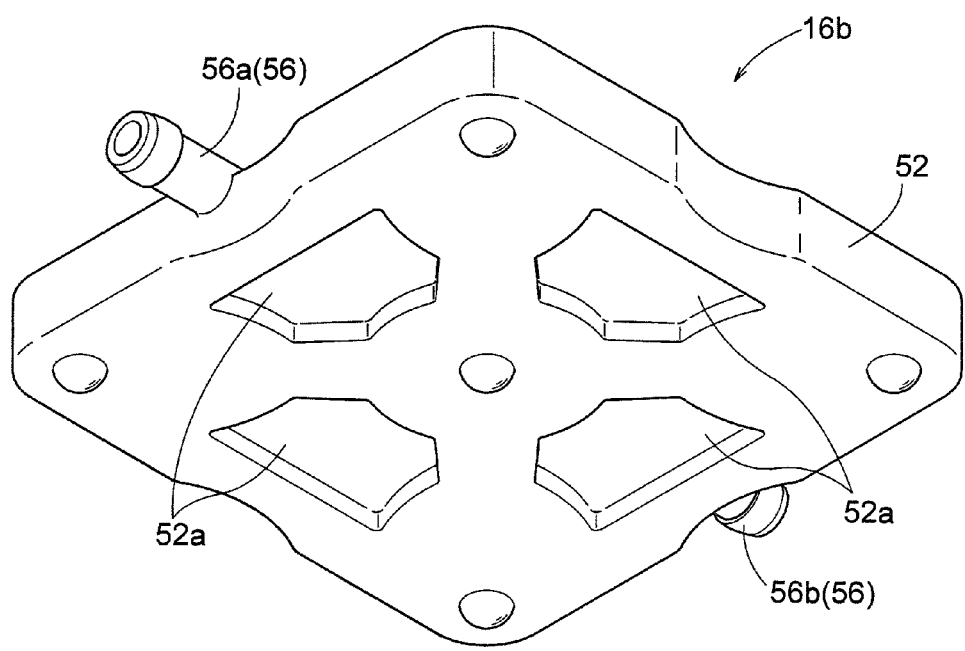
FIG. 19 is a perspective view showing an external appearance of a back side of the plant cultivating apparatus (first using mode)

FIGS. 18 and 19 show the plant cultivating apparatus 16b in a first using mode (FIG. 18 shows a front side thereof; FIG. 19 shows a back side thereof). The plant cultivating apparatus 16b includes a water-storage tray 52 for storing water to be supplied to the plant P, a plurality of circular retaining portions 53 each for accommodating a cultivating bed 55 for cultivating the plant P, and a cover portion 54 for covering the water-storage tray 52 from above. As shown in FIG. 19, the water-storage tray 52 includes raised bottom portions 52a formed between the retaining portions 53.

Figure 20:
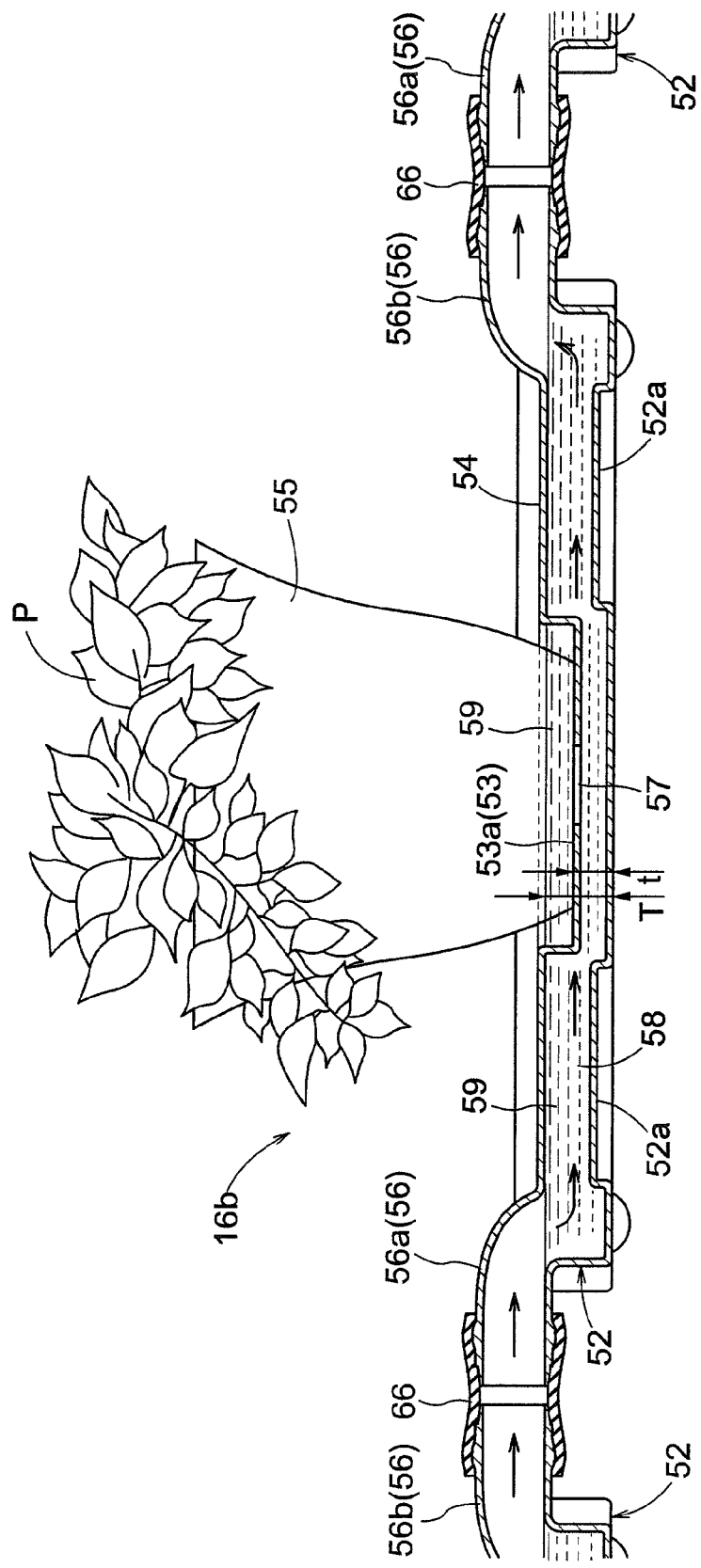
FIG. 20 is a sectional view of the plant cultivating apparatus (first using mode)

FIG. 20 is a schematic cross section of the plant cultivating apparatus 16b as viewed form a direction of arrow A in FIG. 18 with the cultivating bed 55 being accommodated in one of the retaining portions 53.

As the cultivating bed 55, a planting pot or a planter holding proper planting soil therein and having a bore formed in a bottom thereof, or planting soil per se may be used, for example. However, the cultivating bed is not limited to those materials, but any material will do as long as it is accommodated in the retaining portion to allow water to flow thereinto from a bottom portion thereof so that the roots of the plant can absorb water flowed into the material. As planting soil, any solid culture medium for cultivating the plant may be used, including natural planting soil such as red-ball soil, weathered yellowish volcanic soil (kanuma soil), leaf soil, peat or bog moss, or various kinds of resin foam such as vermiculite, pearlite, urethane resin or phenol resin, or artificial planting soil such as rock wool or hydroponic balls, for example. Further, the shape of the culture medium is not limited to the one illustrated, but may be desirably selected from various forms such as block, sands, pellets or lumps, for example. When the culture medium made of sands, pellets or lumps is used, they may be put into a net-like bag, for example, in use so as not to leak to the outside.

The water-storage tray 52 further includes two connecting nozzles (connecting portions) 56 for allowing the adjacent water-storage trays 52 to communicate with each other. The connecting nozzles 56 are distinguished from each other depending on the flowing direction of water. One of the connecting nozzles acts as a flow-in connecting nozzle (flow-in connecting portion) 56a while the other of the connecting nozzles as a flow-out connecting nozzle (flow-out connecting portion) 56b.

As shown in FIG. 20, the flow-in connecting nozzle 56a may be removably connected to the flow-out connecting nozzle 56b of the adjacent water-storage tray 52 through a connecting hose 66 so that water flows from the water-storage tray 52 to the adjacent water-storage tray 52 through the connection hose 66. Thus, the flow-in connecting nozzle 56a of the water-storage tray 52 may be connected to the flow-out connecting nozzle 56b of the adjacent water-storage tray 52 through the connecting hose 66 successively, which allows the number of water-storage trays 52 desired to be communicated and connected with each other. In this way, water is supplied to all of the plural water-storage trays 52 that are communicated and connected with each other.

Arrows in FIG. 20 show the flowing direction of water. Water flowing from the flow-in connecting nozzle 56a is temporarily retained in a water-storage space 58 within the water-storage tray 52. The water-storage space 58 represents a maximum space for storing water that is defined between the lowest position of an inner peripheral surface of the connecting nozzle 56 and a bottom surface of the water-storage tray 52. When the water-storage space 58 is filled with standing water 59, water flows out of the flow-out connecting nozzle 56b due to action of overflow. The retaining portion 53 has a bottom portion 53a provided with a through-bore 57 (feed-water portion) to communicate with the water-storage space 58. The bottom portion 53a is located at a level "t" lower than the lowest level of the inner peripheral surface of the connecting nozzle 56 (that is, a maximum level T standing water 59 as filling up the water-storage space 58).

Therefore, when water is caused to overflow the water-storage space 58, standing water 59 wells up into the retaining portion 53 through the through-bore 57, and water is constantly maintained in the retaining portion 53 at a level achieved by deducting the level "t" of the bottom portion 53a from the level T of standing water 59. The depth of the water-storage space 58 or the depth or width of the retaining portion 53 may vary to adjust the amount of water to be supplied to the retaining portion 53, thereby supplying (watering) a proper amount of water at all times depending on the cultivating condition (the kind of plant, for example).

A ventilation hole 74 is formed in a top surface of the cover portion 54 near the flow-out connecting nozzle 56b for allowing the water-storage space 58 to communicate with the outside. Air accumulated in the water-storage space 58 is discharged through the ventilation hole 74. This prevents standing water 59 from overflowing and flowing out to the flow-out connecting nozzle 56b less smoothly due to air accumulation, which makes it easy to supply water to all the water-storage trays 52 appropriately when the plurality of water-storage trays 52 are communicated and connected with each other.

In use, a plurality of the plant cultivating apparatuses 16b may be interconnected and arranged depending on the site of the building or the area of the rooftop to be greened. Such assembly of the plant cultivating apparatuses 16b includes one flow-in connecting nozzle 56a and one flow-out connecting nozzle 56b which remain unconnected and open. When the water-supply tube 20 (hose, for example) is connected to the open flow-in connecting nozzle 56a for water supply, the water-storage trays 52 of the plant cultivating apparatuses 16b overflow successively, whereby water is supplied to all the plant cultivating apparatuses 16b eventually. When the water-storage trays 52 of all the plant cultivating apparatuses 16b are filled with water, water is discharged through the open flow-out connecting nozzle 56b. Thus, the open flow-out connecting nozzle 56b may be connected to a proper pipe or fluid passage to discharge water. It is also possible to connect the open flow-in connecting nozzle 56a to the open flow-out connecting nozzle 56b through a hose or the like to circulate water through a pump while supplying a proper amount of water additionally from the outside.

The plant cultivating apparatus 16b may be manufactured by the known molding techniques (including injection molding or blow molding, preferably by blow molding) using thermoplastic resin such as polypropylene resin, polyethylene resin or polyethylene terephthalate (PET).

FIGS. 21 to 26 show the plant cultivating apparatus 16b in a second using mode.

Figure 21:
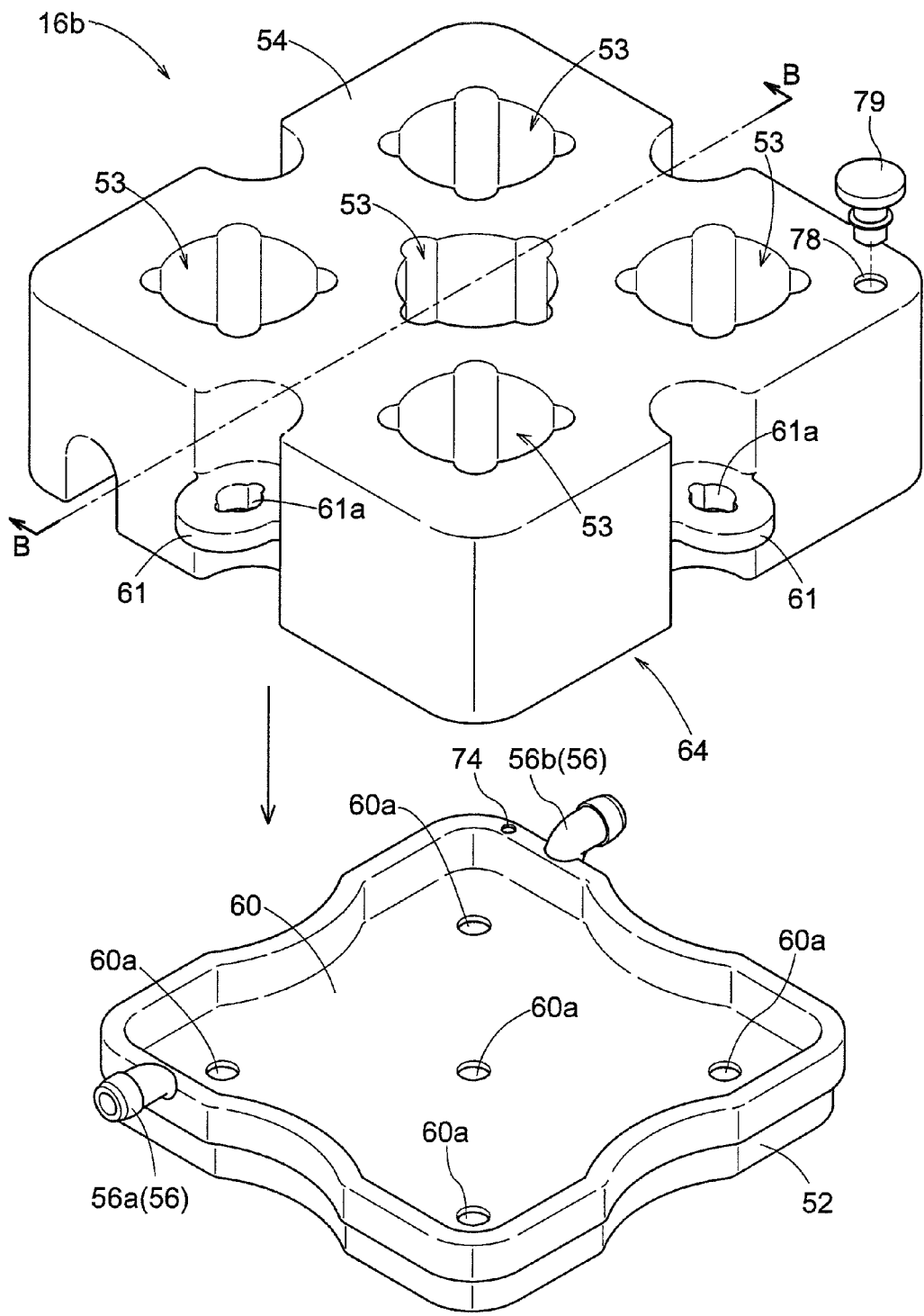
FIG. 21 is a perspective view showing an external appearance of the plant cultivating apparatus (second using mode)

As shown in FIG. 21, the plant cultivating apparatus 16b in the second using mode includes the water-storage tray 52 for storing water to be supplied to the plant, and a one-piece molded plant cultivating container 64 (molded product having a plurality of retaining portions 53 for containing the cultivating bed 55 for cultivating the plant P that are integrally formed with the cover portion 54 for covering the water-storage tray 52 from above). The water-storage tray 52 and the plant cultivating container 64 are separably fitted to each other.

Figure 22:
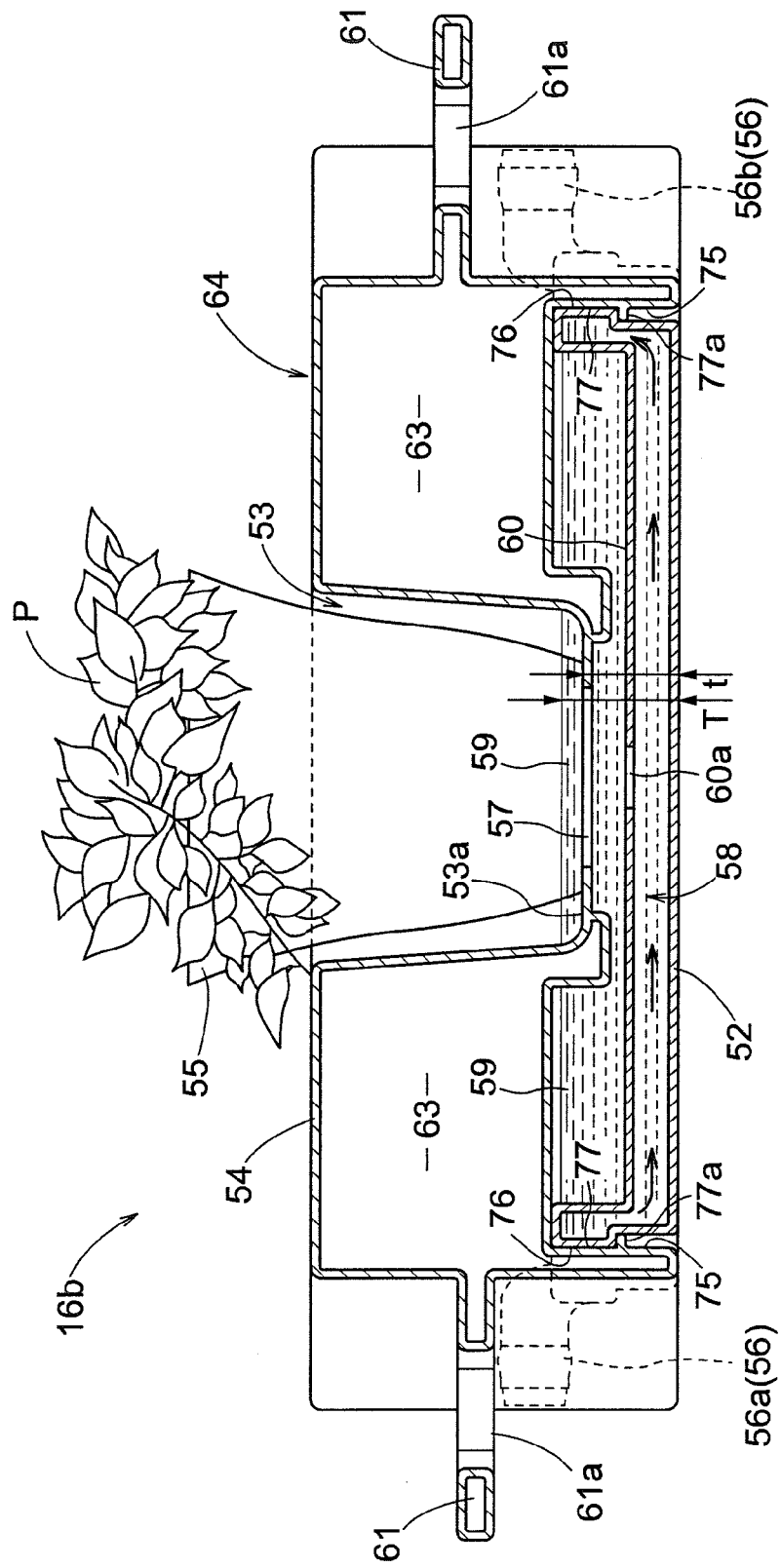
FIG. 22 is a sectional view of the plant cultivating apparatus (second using mode)

FIG. 22 schematically shows a section of the plant cultivating apparatus 16b in the second using mode with the cultivating bed 55 being accommodated within one of the retaining portions 53 (where the water-storage tray 52 is fitted to the plant cultivating container 64) taken along arrow B-B in FIG. 21.

As shown in FIGS. 21 and 22, similarly to the first using mode, the water-storage tray 52 of the plant cultivating apparatus 16b in the second using mode includes the two connecting nozzles (connecting portions) 56 for allowing the adjacent water-storage trays 52 to communicate with each other. The connecting nozzles 56 are distinguished from each other depending on the flowing direction of water. One of the connecting nozzles acts as the flow-in connecting nozzle (flow-in connecting portion) 56a while the other of the connecting nozzles as the flow-out connecting nozzle (flow-out connecting portion) 56b.

Further, the water-storage tray 52 of the second using mode is provided with a receiving portion 60 on which the plant cultivating container 64 is placed. The receiving portion 60 has a well-up opening 60a. Water flowing through the flow-in connecting nozzle 56a wells up through the opening 60a to flow over the receiving portion 60 and is stored in the water-storage space 58 as in the similar way to the first using mode.

When the water-storage space 58 is filled with standing water 59, water flows out of the flow-out connecting nozzle 56b due to action of overflow. Like the first using mode, the retaining portion 53 has the bottom portion 53a provided with the through-bore 57 (feed-water portion) to communicate with the water-storage space 58. The bottom portion 53a is located at a level "t" lower than the lowest level of the inner peripheral surface of the connecting nozzle 56 (that is, a maximum level T of standing water 59 as filling up the water-storage space 58). Similarly to the first using mode, the ventilation hole 74 is formed in the top surface of the water-storage tray 52 near the flow-out connecting nozzle 56b.

Therefore, when water is caused to overflow the water-storage space 58, standing water 59 that has welled up through the well-up opening 60a and flowed out to the receiving portion 60 wells up into the retaining portion 53 through the through-bore 57, and water is constantly maintained in the retaining portion 53 at a level achieved by deducting the level "t" of the bottom portion 53a from the level T of standing water 59. The depth of the water-storage space 58, the height of the receiving portion 60, or the depth or width of the retaining portion 53 may vary to adjust the amount of water to be supplied to the retaining portion 53, thereby supplying (watering) a proper amount of water at all times depending on the cultivating condition (the kind of plant, for example).

It should be noted that how to join the plurality of plant cultivating apparatus 16b (water-storage trays 52) together as well as how to use and manufacture them in the second using mode are the same as in the first using mode.

As shown in FIG. 22, the plant cultivating container 64 has the bottom portion folded up from the lower side to the upper side at an outer side portion thereof to form a double-wall portion 75, which provides a raised bottom in a central portion thereof to have a recessed shape opened downward. The water-storage tray 52 is placed within the space surrounded by the double-wall portion 75 to be covered entirely with the plant cultivating container 64. Thus, since the entire water-storage space 58 in the water-storage tray 52 is covered with the plant cultivating container 64, a shading effect can be achieved by the plant cultivating container 64 in the entire water-storage space 58, thereby effectively preventing growth of algae and the like in standing water 59.

In order to bring the water-storage tray 52 to fit to the plant cultivating container 64, the water-storage tray 52 has a first fitting portion 76 while the plant cultivating container 64 has a second fitting portion 77. The first fitting portion 76 is provided at an upper side portion of outer peripheries of the water-storage tray 52 to project outward. On the other hand, a projection 77a is provided to project inward from the double-wall portion 75 of the plant cultivating container 64. A recessed portion formed in an upper part of the double-wall portion 75 defined above the projection 77a serves as the second fitting portion 77. The first fitting portion 76 and the second fitting portion 77 are fitted together to attach the plant cultivating container 64 to the water-storage tray 52.

The projection 77a in the second fitting portion 77 is provided in the double-wall portion 75 of the plant cultivating container 64, which means that the second fitting portion 77 is provided in a portion that has an increased strength in the plant cultivating container 64. Thus, the first fitting portion 76 is less easily disengaged from the second fitting portion 77, which allows the plant cultivating container 64 to be readily and properly attached to the water-storage tray 52.

The plant cultivating container 64 has the hollow interior and an opening 78 is provided for allowing the interior space to communicate with the outside. The opening 78 is closed with a removable lid member 79. With the lid member 79 being removed, water or sand is put into the interior space of the plant cultivating container 64 from the opening 78. The plant cultivating container 64 with the lid member 79 being attached can be used as a weight. Thus, when placed on the rooftop, the plant cultivating container 64 can be restrained from being moved or toppling over when the wind blows, for example. On the other hand, the plant cultivating container 64 can be easily carried when the lid member 79 is removed to discharge water or sand that has been put into the container through the opening 78.

Figure 23:
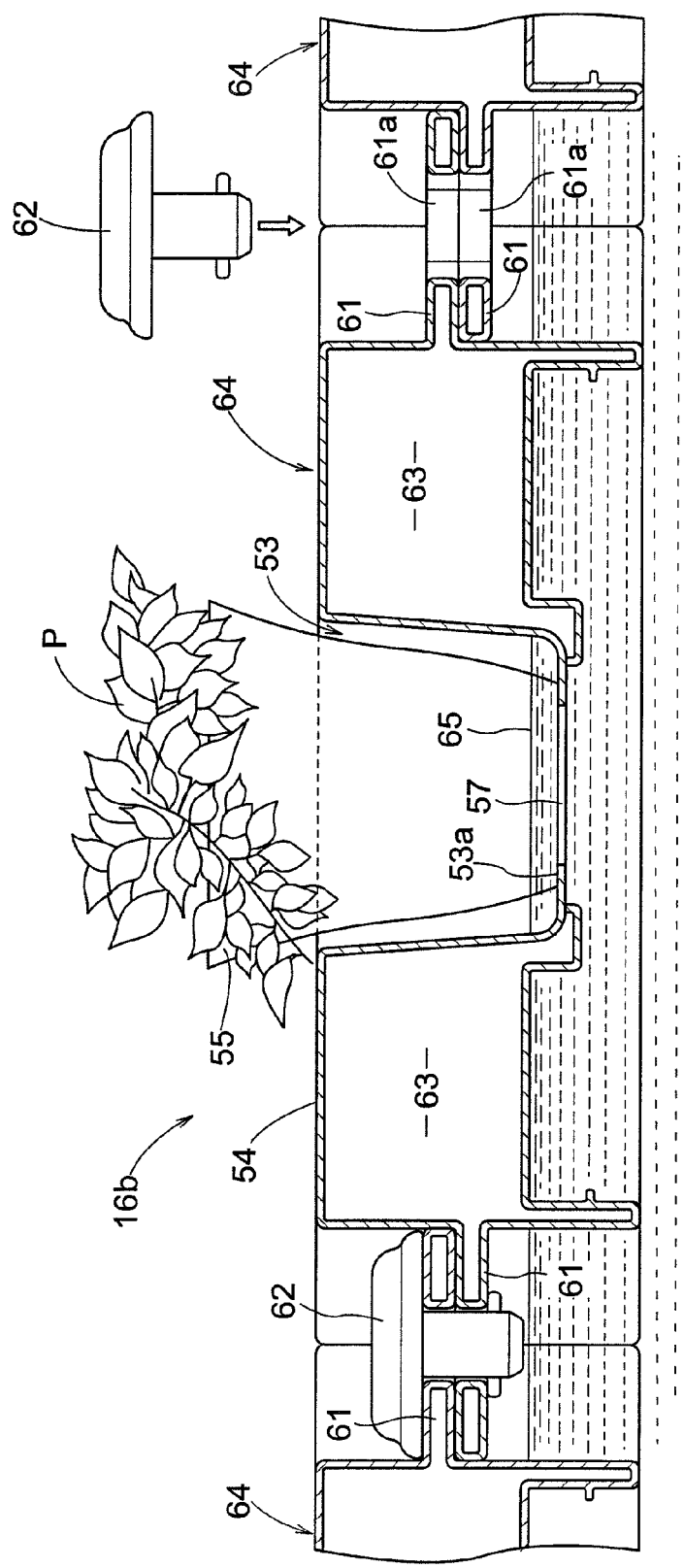
FIG. 23 is a sectional view of the plant cultivating apparatus (second using mode)

As shown in FIG. 23, it is also possible to provide a float portion 63 (portion within which air is confined) for exerting a floating force on the plant cultivating container 64 to allow the plant cultivating container 64 to float in the surface 65 of the water such as a pond, river, lake, etc.

The floating force provided by the plant cultivating container 64 is adjusted so that the bottom portion 53a of the retaining portion 53 is positioned lower than the surface 65 of the water with the cultivating bed 55 being accommodated in the retaining portion 53. The floating force may be adjusted to adjust the amount of water to be supplied to the retaining portion 53.

The plant cultivating container 64 is constructed as the one-piece molded product having the retaining portion 53 and the float portion 63. The float portion 63 is adapted to allow the plant cultivating container 64 to float such that the bottom portion 53a of the retaining portion 53 is positioned lower than the surface 65 of the water such as the pond, river, lake, etc. More particularly, the float 63 is formed in the plant cultivating container 64 by filling the interior space of the hollow plant cultivating container 64 with air and closing the opening 78 with the lid member 79.

The plant cultivating container 64 forms the raised bottom at the central portion thereof having the retaining portion 53 to provide the recessed part opened downward. The plant cultivating container 64 includes a body having an edge portion positioned lower than the bottom portion 53a of the retaining portion 53. The float portion 63 is formed in a peripheral portion of the retaining portion 53 to extend to the position lower than the bottom portion 53a of the retaining portion 53. Thus, the floating force applied by the float portion 63 is increased to prevent the bottom portion 53a of the retaining portion 53 from being positioned too lower than the surface 65 of the water such as the pond, river, lake, etc. Thus, it is prevented that too much water is supplied to the plant P.

In this way, the plant cultivating apparatus 16b can be used floating in the pond, river, lake, etc. The plant cultivating container 64 is provided with a connecting portion 61 for connecting to the adjacent plant cultivating container 64. The connecting portion 61 has a hole 61a. In connecting or joining the plant cultivating containers together, the connecting portions 61 in the adjacent plant cultivating containers 64 are placed with one above the other to align their holes 61a. A proper connecting element 62 (bolt, for example) that can extend through the aligned holes 61a is fitted to fix the holes together.

The connecting portions 61 are provided in the cover portion 54 and arranged in central portions in the four sides of the plant cultivating container 64 that has a rectangular shape as viewed from the top. As shown in FIG. 23, the connecting portion 61 provided at one side of the container is arranged at a vertical position different from that of the connecting portion 61 provided at the other side of the container, whereby the connecting portions 61 of the respective plant cultivating containers 64 that are adjacent to each other in the transverse direction (horizontal direction) are placed one above the other to join those plant cultivating containers 64 together. When the plant cultivating containers 64 that are adjacent to each other in the transverse direction (horizontal direction) are joined together, one of the connecting portions 61 that is located at the one side (upper side in FIG. 23) of the plant cultivating container 64 in the transverse direction (horizontal direction) is positioned above the connection portion 61 of the adjacent plant cultivating container 64 while the other of the connecting portions 61 that is located at the other side (lower side in FIG. 23) of the plant cultivating container 64 in the transverse direction (horizontal direction) is positioned below the connection portion 61 of the opposite adjacent plant cultivating container 64. In this manner, the plant cultivating containers 64 are aligned vertically.

Each connecting portion 61 is provided to extend horizontally in a portion recessed inward from the outer side of the plant cultivating container 64. When the plant cultivating containers 64 that are adjacent to each other in the transverse direction (horizontal direction) are joined together, the connecting portions 61 of those plant cultivating containers 64 are placed one above the other to bring the container bodies of the respective plant cultivating containers 64 into contact with each other. As a result, the floating forces applied by the float portions 63 provided in the plurality of plant cultivating containers 64 can be combined to float the plurality of plant cultivating containers 64 integrally or as a unit assembly. Further, either a top surface or bottom surface of the connecting portion 61 provided at the one side of the container body of the plant cultivating container 64 has generally the same height as either a bottom surface or top surface of the connecting portion 61 provided at the other side. Thus, the container bodies of the plant cultivating containers 64 are brought into contact with each other to be joined together while the plant cultivating containers 64 are vertically aligned.

Figure 24:
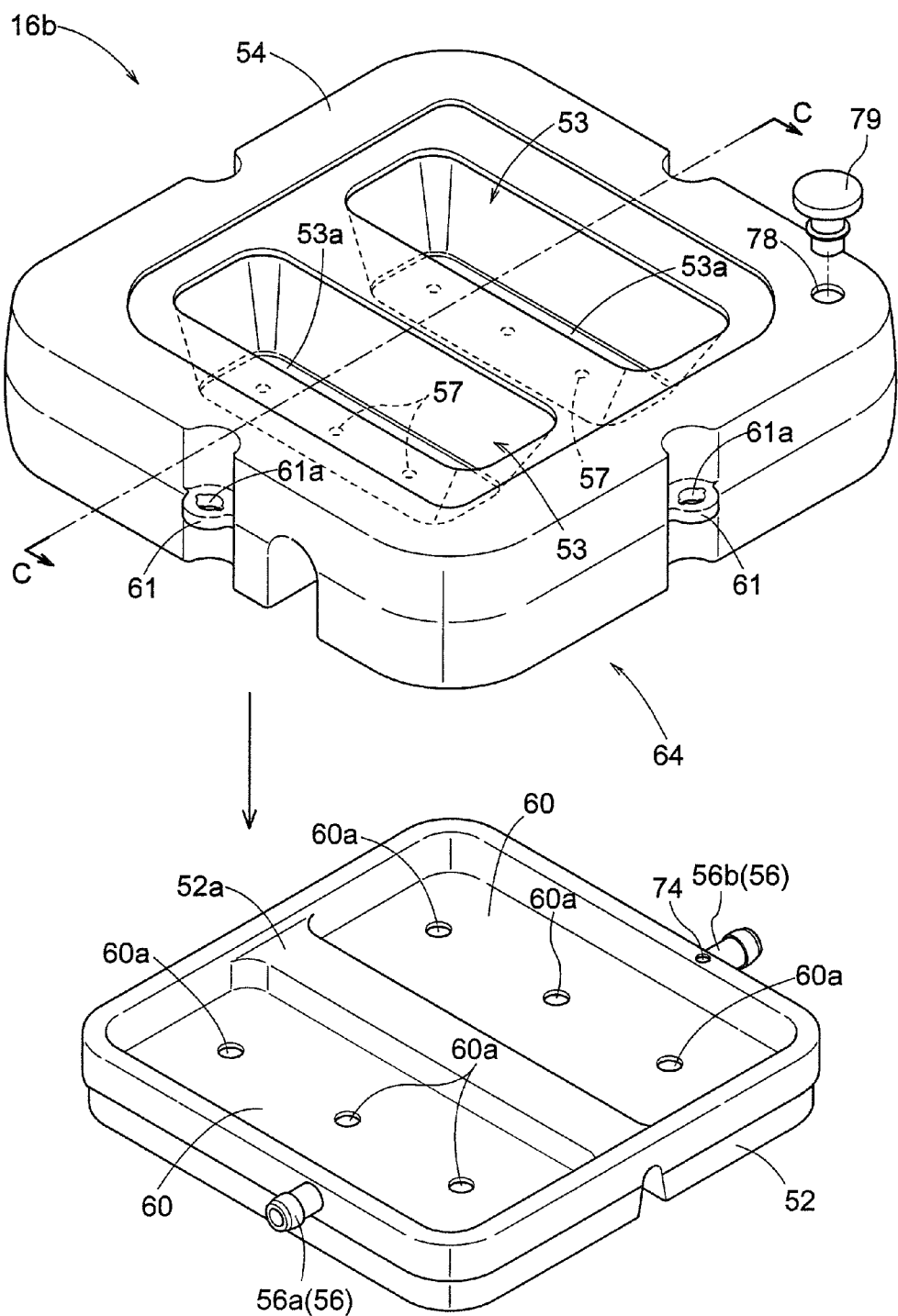
FIG. 24 is a perspective view showing an external appearance of the plant cultivating apparatus (second using mode)
Figure 25:
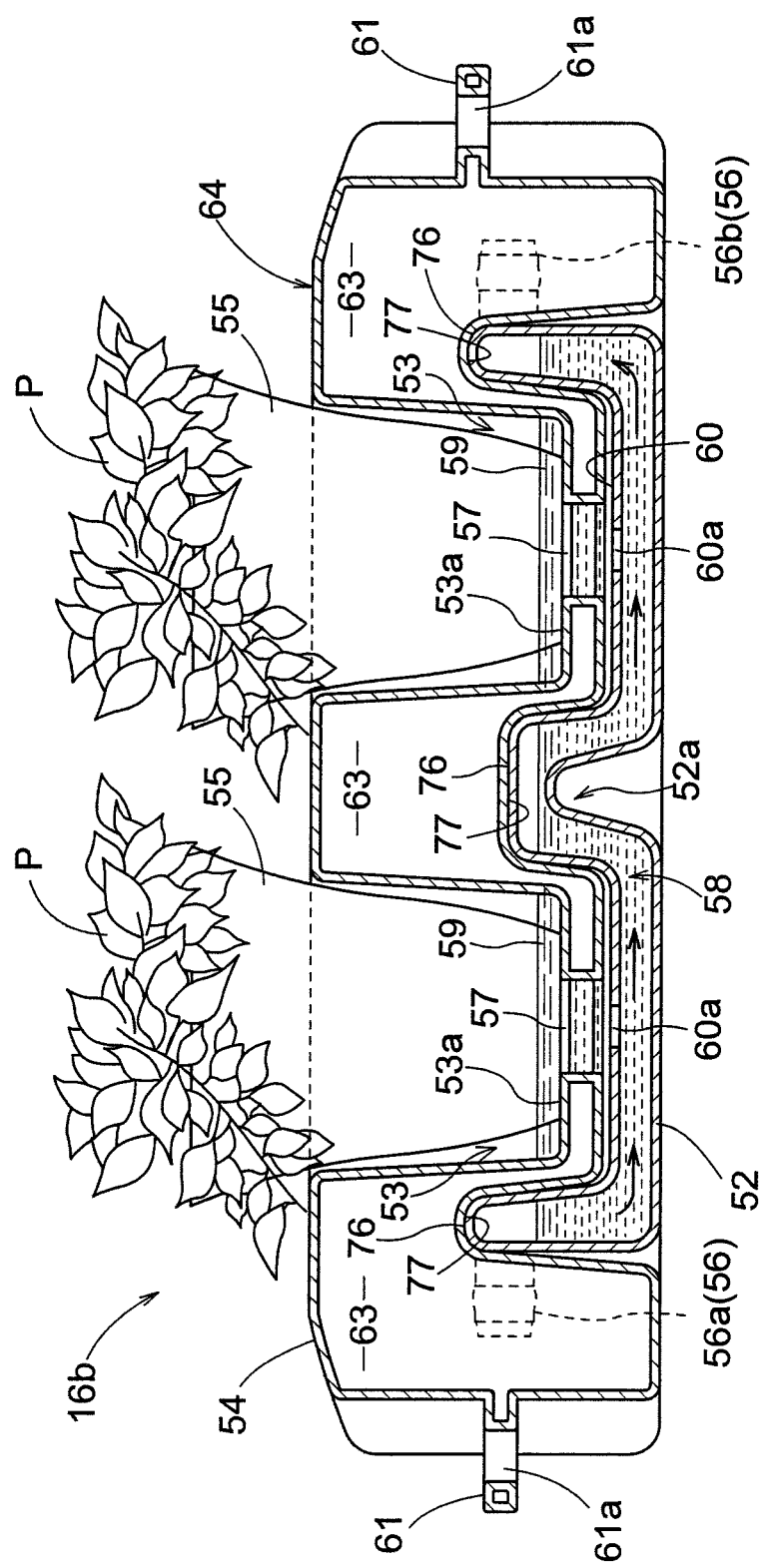
FIG. 25 is a sectional view of the plant cultivating apparatus (another mode of the second using mode)
Figure 26:
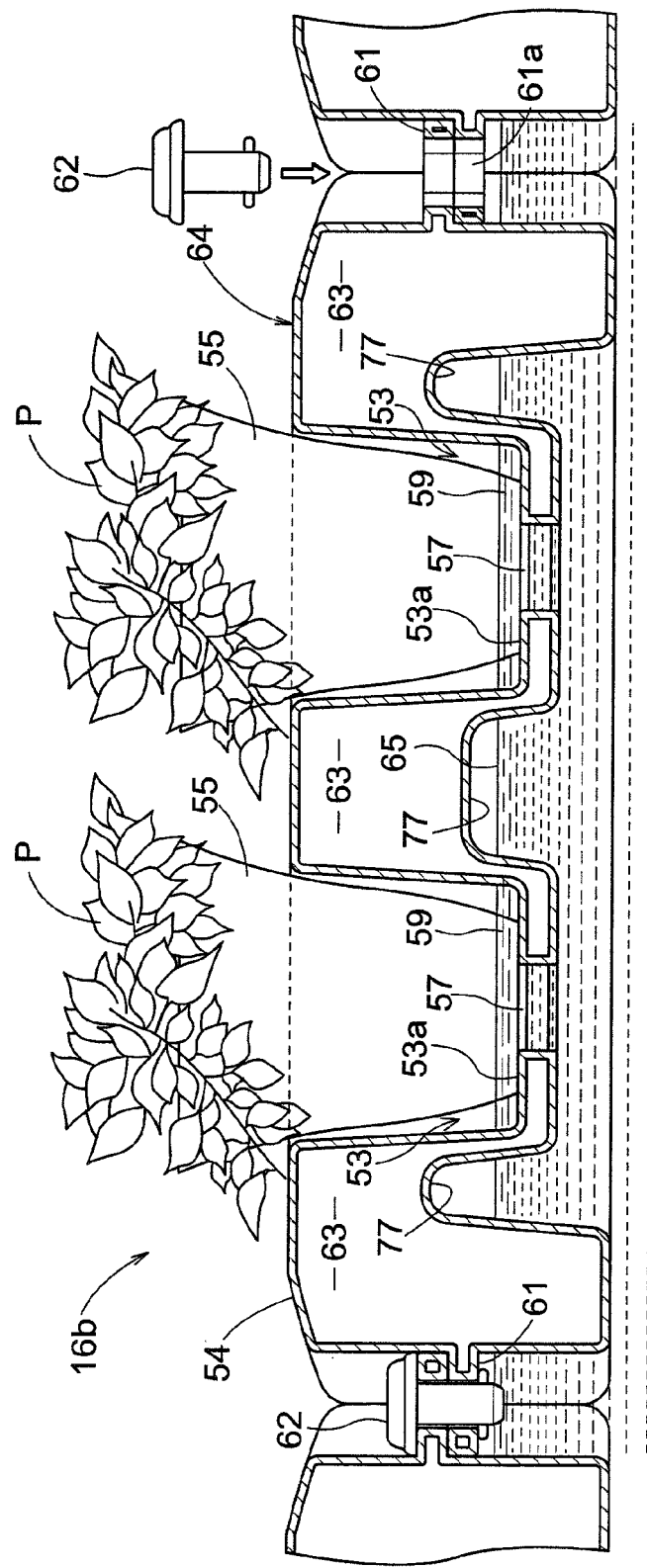
FIG. 26 is a sectional view of the plant cultivating container.

FIGS. 24 to 26 show another mode of the second using mode. More particularly, as shown in FIG. 24, the plant cultivating container 64 in this mode includes the retaining portion 53 having a greater width and a plurality of (three in FIG. 24, which is not limitative) through-bores 57 formed in the bottom portion 53a thereof. (It should be noted that, in the plant cultivating container 64 shown in FIG. 21, each retaining portion 53 has one through-bore 57.) FIG. 25 schematically shows a section of the plant cultivating apparatus 16b in accordance with the second using mode (where the water-storage tray 52 is fitted to the plant cultivating container 64) taken along arrow C-C in FIG. 24. As shown in FIG. 25, the water-storage tray 52 has the raised bottom portion 52a to form the minimum necessary water-storage space 58, thereby saving water to be used. Similarly to the above-noted mode, the removable lid member 79 is provided in the opening 78 of the plant cultivating container 64 to close the opening 78.

According to another mode of the second using mode, in the same way as the above-noted mode, the water-storage tray 52 is provided with the first fitting portion 76 while the plant cultivating container 64 with the second fitting portion 77. The arrangements and the shapes of those fitting portions, however, are different from those shown in FIGS. 21 to 23. More particularly, as shown in FIG. 25, the first fitting portions 76 are formed as projections extending upward from the top surface of the water-storage tray 52 at opposite end portions and a central portion thereof in the horizontal direction. On the other hand, the second fitting portions 77 are formed as recesses representing raised bottom portions of the bottom surface of the plant cultivating container 64 at opposite end portions and a central portion thereof in the horizontal direction. The plant cultivating container 64 is placed on the water-storage tray 52 such that the convex first fitting portion 76 and the concave second fitting portion 77 are fitted together, thereby attaching the plant cultivating container 64 to the water-storage tray 52.

FIG. 26 shows that the plant cultivating container 64 shown in FIGS. 24 and 25 floats in the surface 65 of the water such as the pond, river, lake, etc. In this case, similarly to the above-noted mode, the float portion 63 is provided so that the bottom portion 53a of the retaining portion 53 is positioned lower than the surface 65 of the water to allow the plant cultivating container 64 to float. Similarly to the above-noted mode, the plant cultivating container 64 is provided with the connecting portion 61 to connect to the adjacent plant cultivating container 64 in the horizontal direction.

Figure 27:
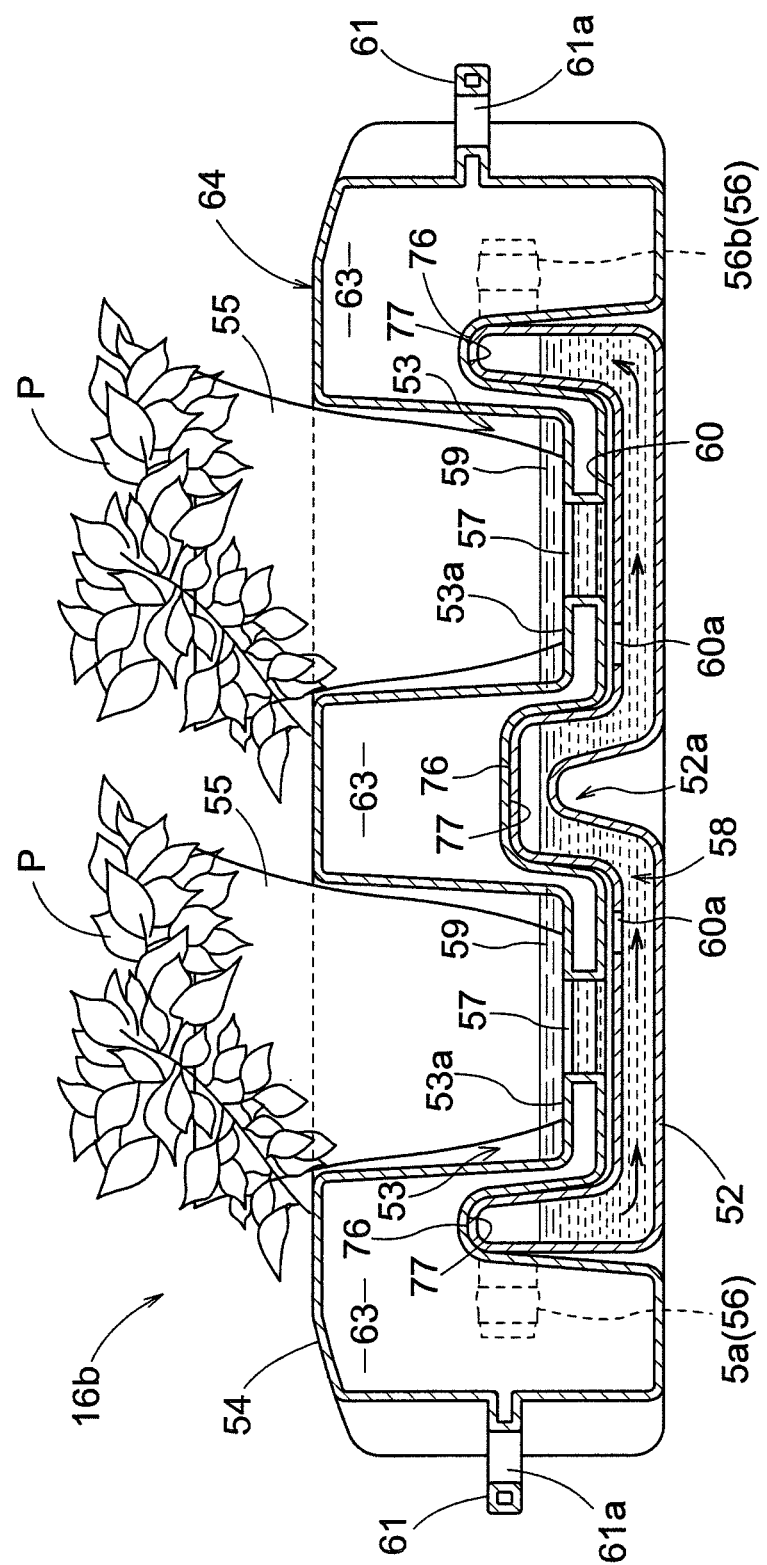
FIG. 27 is a sectional view of the plant cultivating apparatus (further mode of the second using mode)

FIG. 27 shows the plant cultivating apparatus 16b as shown in FIGS. 24 to 26 in another mode. More particularly, as shown in FIG. 27, the well-up opening 60a formed in the water-storage tray 52 is located in a horizontal position different from that of the through-bore 57 formed in the bottom portion 53a of the retaining portion 53, with the plant cultivating container 64 being attached to the water-storage tray 52. (In FIGS. 24 and 25, the well-up opening 60a formed in the water-storage tray 52 is located in the horizontal position same as that of the through-bore 57 formed in the bottom portion 53a of the retaining portion 53, with the plant cultivating container 64 being attached to the water-storage tray 52.) Such an arrangement in which the well-up opening 60a is located in the horizontal position different from that of the through-bore 57 prevents the roots of the plant P from entering the water-storage space 58 through the well-up opening 60a even if they pass through the through-bore 57. As a result, it is prevented that the flow of standing water 59 is hampered by resistance of the roots of the plant P in the water-storage space 58.

Figure 28:
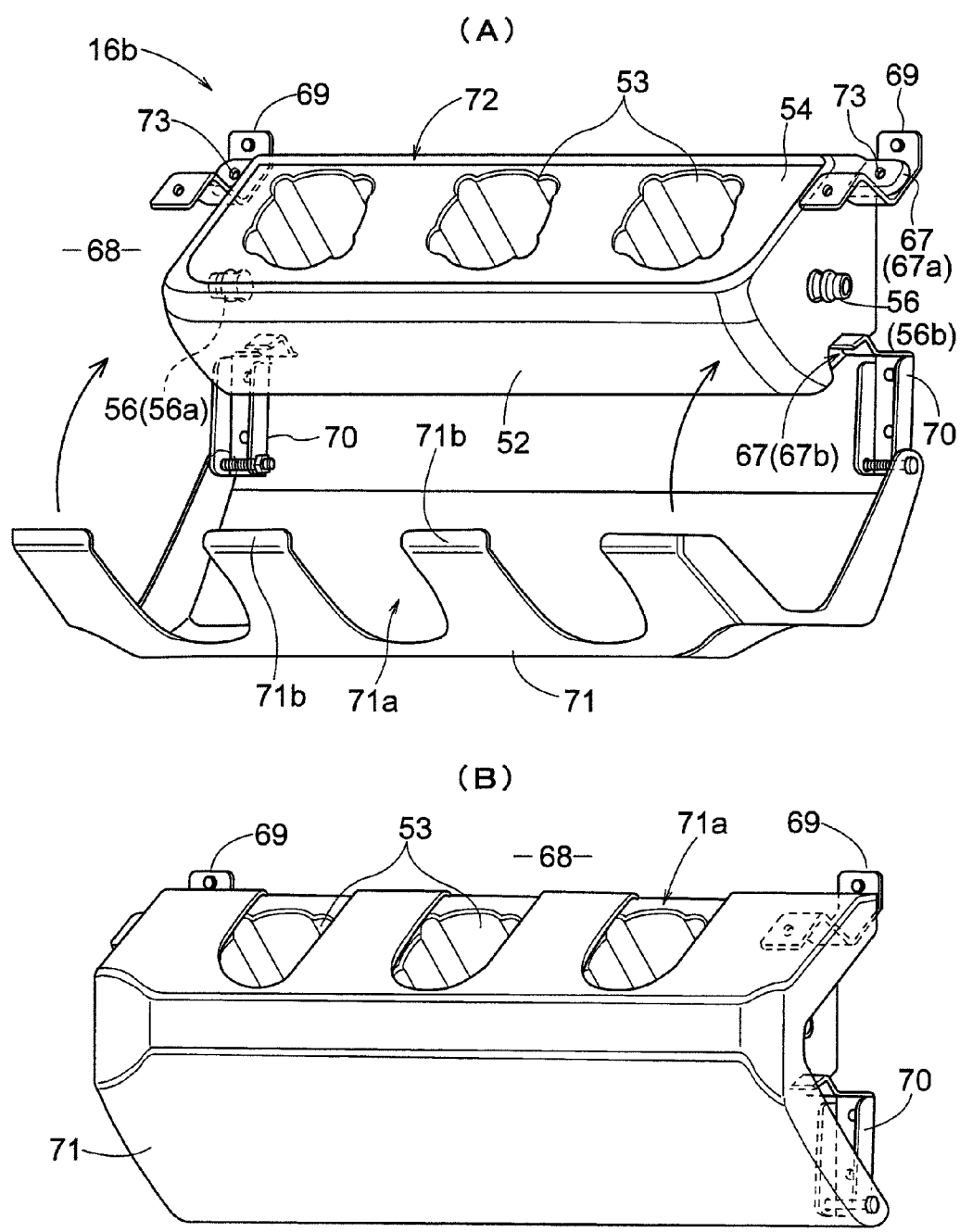
FIG. 28 is a perspective view showing an external appearance of the plant cultivating apparatus (third using mode)
Figure 29:
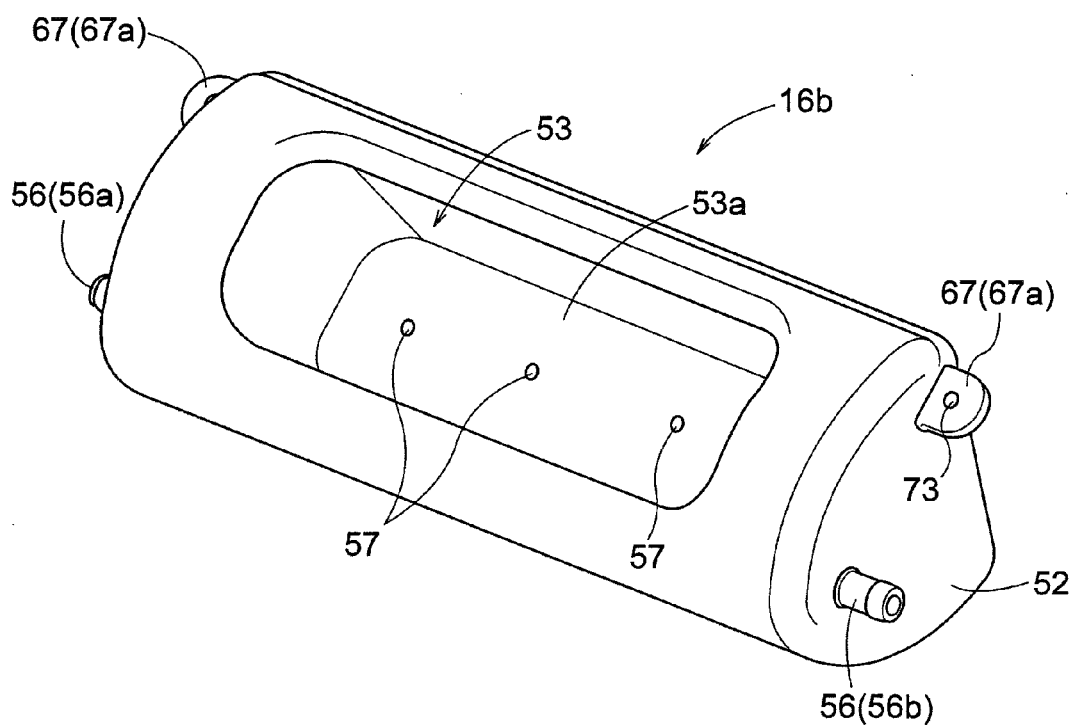
FIG. 29 is a perspective view showing an external appearance of the plant cultivating apparatus (another mode of the third using mode)

FIGS. 28(A), 28(B) and 29 show the plant cultivating apparatus 16b in a third using mode. As shown in FIG. 28(A), similarly to the above-noted using mode, the plant cultivating apparatus 16b includes the water-storage tray 52 for storing water to be supplied to the plant P, a plurality of the circular retaining portions 53 for housing the cultivating bed for planting the plant therein, and the cover portion 54 for covering the water-storage tray 52 from above.

The water-storage tray 52 further includes two connecting nozzles (connecting portions) 56 for allowing the adjacent water-storage trays 52 to communicate with each other. The connecting nozzles 56 are distinguished from each other depending on the flowing direction of water. One of the connecting nozzles acts as the flow-in connecting nozzle (flow-in connecting portion) 56a while the other of the connecting nozzles as the flow-out connecting nozzle (flow-out connecting portion) 56b.

The water-storage tray 52 is provided with an attaching portion 67 (attaching projection 67a and attaching recess 67b). The attaching projection 67a is engageable with a main body-metal fitting 69 that is attached to a wall surface 68 in advance. The attaching recess 67b is engageable with a protection cover-metal fitting 70 that is also attached to the wall surface 68 in advance.

In this way, the plant cultivating apparatus 16b of the third using mode can be installed in the wall surface 68 by bringing the attaching projection 67a and the attaching recess 67b into engagement with the main body-metal fitting 69 and the protection cover-metal fitting 70, respectively, as shown in FIG. 28(A). Both the main body-metal fitting 69 and the attaching projection 67a include bolt bores 73 for receiving bolts. The attaching projection 67a is attached to the main body-metal fitting 69, with the bolt bores 73 being aligned. Then, the bolt having a desired length is inserted through the aligned bolt bores 73, which is fixed by a nut and the like from the back side of the main body-metal fitting 69, thereby securing the plant cultivating apparatus 16b to the wall surface 68 more reliable.

Further, a protection cover member 71 (made of stainless steel or FRP (fiber reinforced plastic), for example) is hinged to the protection cover-metal fitting 70 to be swingable vertically. The protection cover member 71 has a plurality of openings 71a and a plurality of hooking portions 71b.

As shown in FIGS. 28(A) and 28(B), in the plant cultivating apparatus 16b of the third using mode, the attaching portion 67 is engaged with the main body-metal fitting 69 and the protection cover-metal fitting 70, and then the protection cover member 71 is lifted upward to cover the plant cultivating apparatus 16b thereby to bring the hooking portions 71b to be hooked to a stepped portion (hooked portion 72) provided in the top surface of the plant cultivating apparatus 16b for fixing.

Here, as shown in FIG. 28(B), the position and size of each opening 71a of the protection cover member 71 are adapted to the position and size of each retaining portion 53 so as not to cover the retaining portion 53.

FIG. 29 shows the plant cultivating apparatus 16b in another mode of the third using mode. More particularly, the plant cultivating apparatus 16b in this mode includes the retaining portion 53 having a greater width and a plurality of (three in FIG. 29, which is not limitative) through-bores 57 formed in the bottom portion 53a thereof. (It should be noted that, in the plant cultivating apparatus 16b shown in FIG. 28, one through-bore 57 is provided for each retaining portion 53.)

There is no limitation, in particular, in the shape (circular, quadrangular, hexagonal, etc.) of the plant cultivating apparatus 16b noted above and in the shape and the number of the retaining portions provided within the plant cultivating apparatus 16b. Any desired arrangement can be employed as necessary.

In the foregoing using modes, the plurality of plant cultivating apparatuses 16b are joined together through the connecting hoses. Instead, the connecting nozzles may be directly connected together.

The position and the number of the connecting nozzles (connecting portions) provided in the plant cultivating apparatus 16b are not limited to those of the foregoing using modes, but may be desirably selected as long as they serve to supply and discharge water properly by action of overflow. When the quadrangular plant cultivating apparatus 16b is employed and four connecting nozzles are provided in the central portions of the four sides of the apparatus, wider variations of the overall configuration formed by the plurality of plant cultivating apparatuses 16b joined together can be provided than the plant cultivating apparatus 16b having only two connecting nozzles as in the foregoing using mode. Therefore, it becomes easy to install the plant cultivating apparatus or apparatuses 16b of the present invention to adapt it to the area or shape of the site or rooftop of the building. It should be noted that any proper plug may be used to close the connecting nozzle that remains unconnected (unused) to prevent water from flowing out of the apparatus.

Third Embodiment

Figure 30:
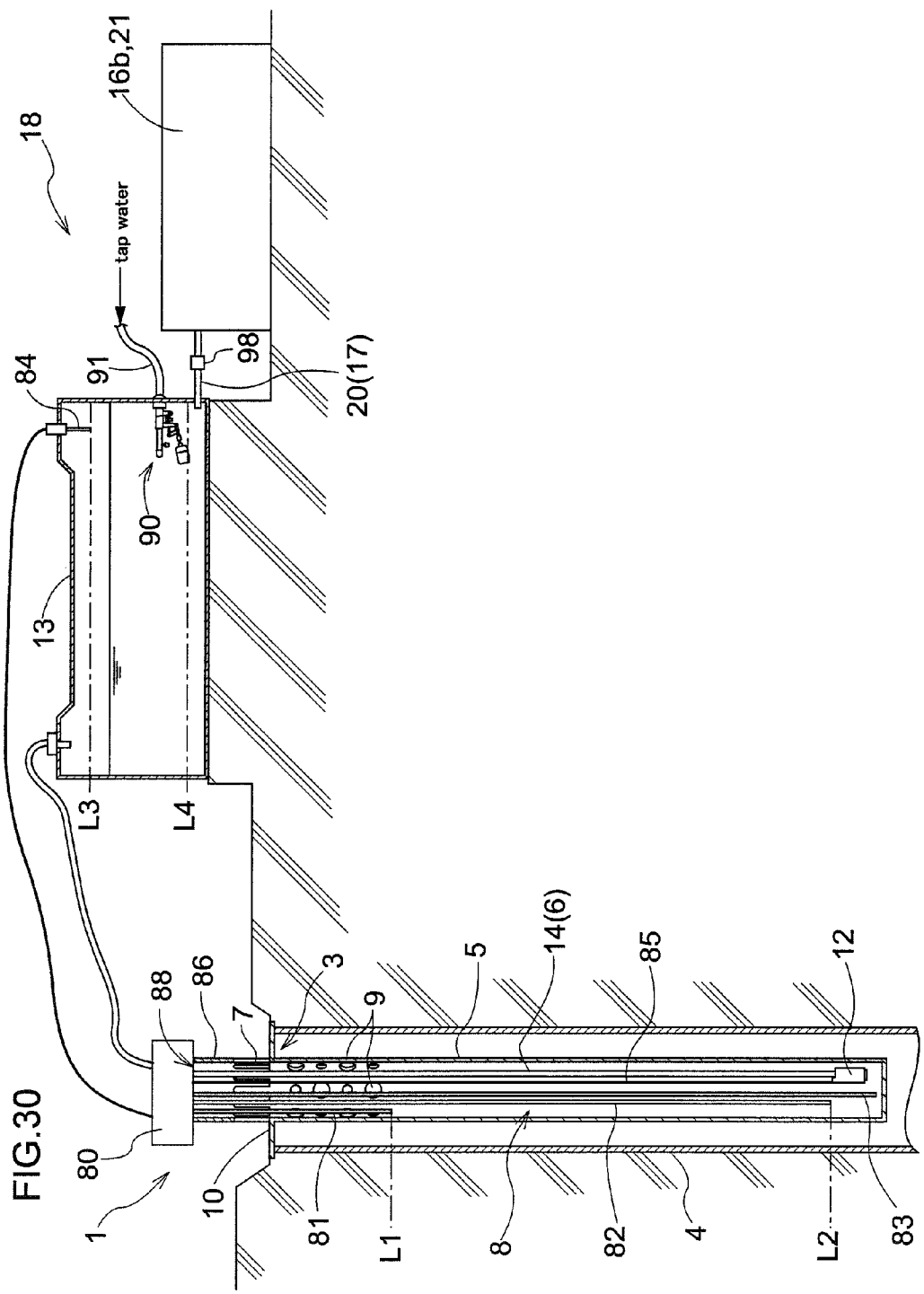
FIG. 30 schematically shows a further plant cultivating system comprising the rainwater catchment apparatus of the present invention in combination with a plant cultivating apparatus.

FIG. 30 schematically shows the plant cultivating system 18 further comprising a rainwater collection control member 80 and a tap water-supply portion 90, for example.

The plant cultivating system 18 comprises the rainwater catchment apparatus 1, the plant cultivating apparatus for cultivating the plant (which corresponds to the container body 21 in the first embodiment or the plant cultivating apparatus 16b in the second embodiment), and the water-supply mechanism 17 (water-supply tube 20) for supplying water pumped up by the rainwater catchment apparatus 1 to the plant cultivating apparatus.

As shown in FIGS. 30 and 31(A), the reservoir 5 of the rainwater catchment apparatus 1 is provided with a mounting portion 86 at an upper part thereof for attaching the rainwater collection control member 80 thereto. The mounting portion 86 includes an opening edge 87 (see FIG. 31(B)) on which the rainwater collection control member 80 is placed, a plurality of rainwater inlets 7 for introducing rainwater into the water-storage portion 8 of the reservoir 5, and a cut-away portion 89 for receiving a power cable or the like.

Figure 31:
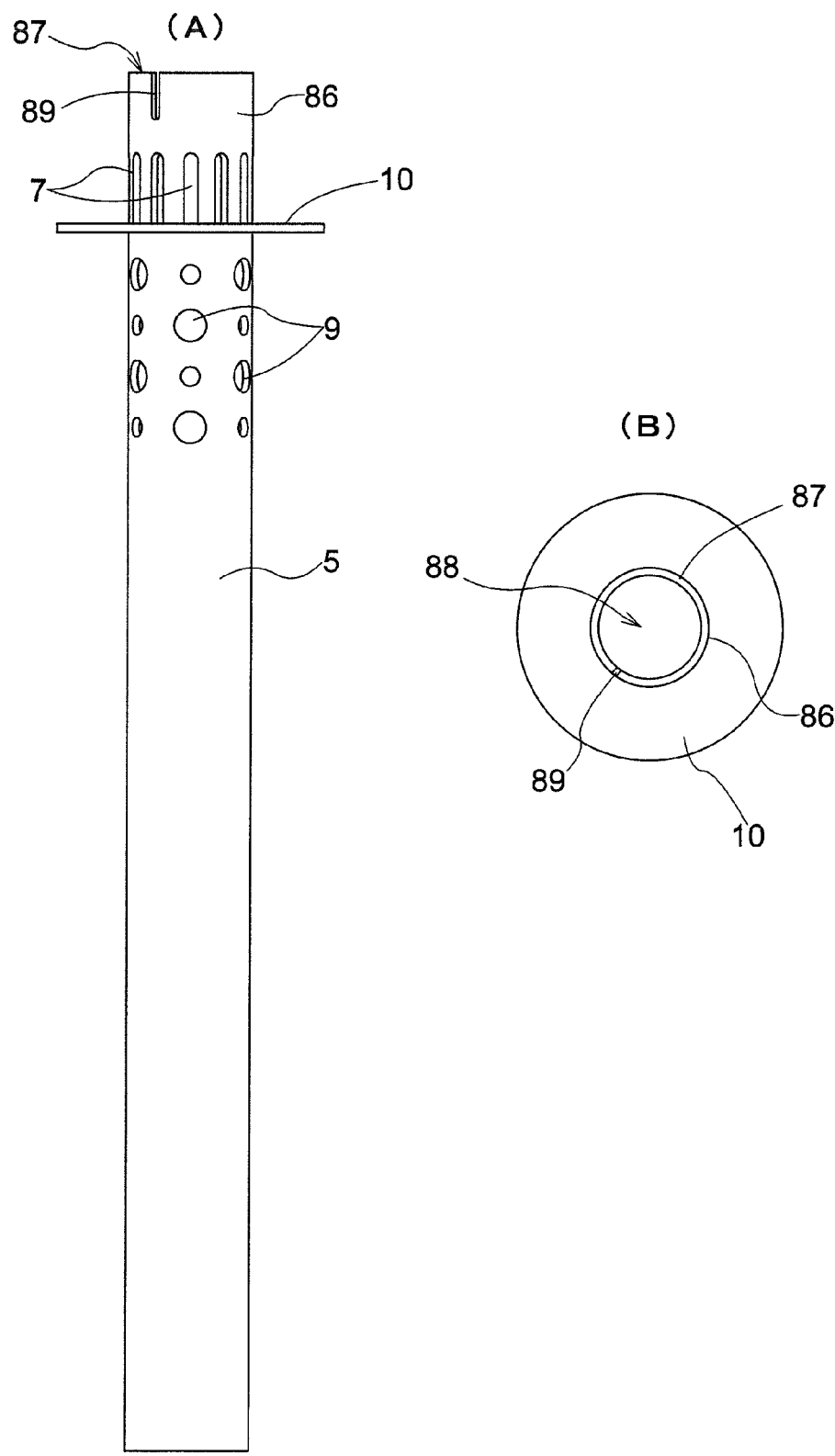
FIG. 31(A) is a side view of the reservoir and a mounting portion.
FIG. 31(B) is a top plan view of the reservoir and the mounting portion.

As shown in FIGS. 30 and 31, the rainwater collection control member 80 includes a first level sensor 81, second level sensor 82, third level sensor 83 and fourth level sensor 84. In mounting the rainwater collection control member 80 on the mounting portion 86, the first level sensor 81, second level sensor 82 and third level sensor 83 are inserted through an opening 88 of the mounting portion 86 to place a main body of the rainwater collection control member 80 on the opening edge 87.

The rainwater collection control member 80 is adapted to detect the level of water stored in the reservoir 5 by the first level sensor 81, second level sensor 82 and third level sensor 83 and to detect the level of water stored in the water-storage tank 13 by the fourth level sensor 84.

The rainwater collection control member 80 is adapted to give a command to the draw-up pump 12 through wiring 85 to activate the draw-up pump 12 and perform control to pump up water stored in the reservoir 5 to the water-storage tank 13 when the level of water stored in the reservoir 5 reaches a level L1 detected by the first level sensor 81 or above, while stopping the draw-up pump 12 when the level of water is lower than a level L2 detected by the second level sensor 82.

Further, the rainwater collection control member 80 is adapted to detect the level of water stored in the water-storage tank 13 by the fourth level sensor 84, and stop the draw-up pump 12 quickly when the water-storage tank 13 is filled up and the fourth level sensor 84 detects that the level of water in the water-storage tank 13 reaches a level L3 (see FIG. 30).

Figure 32:
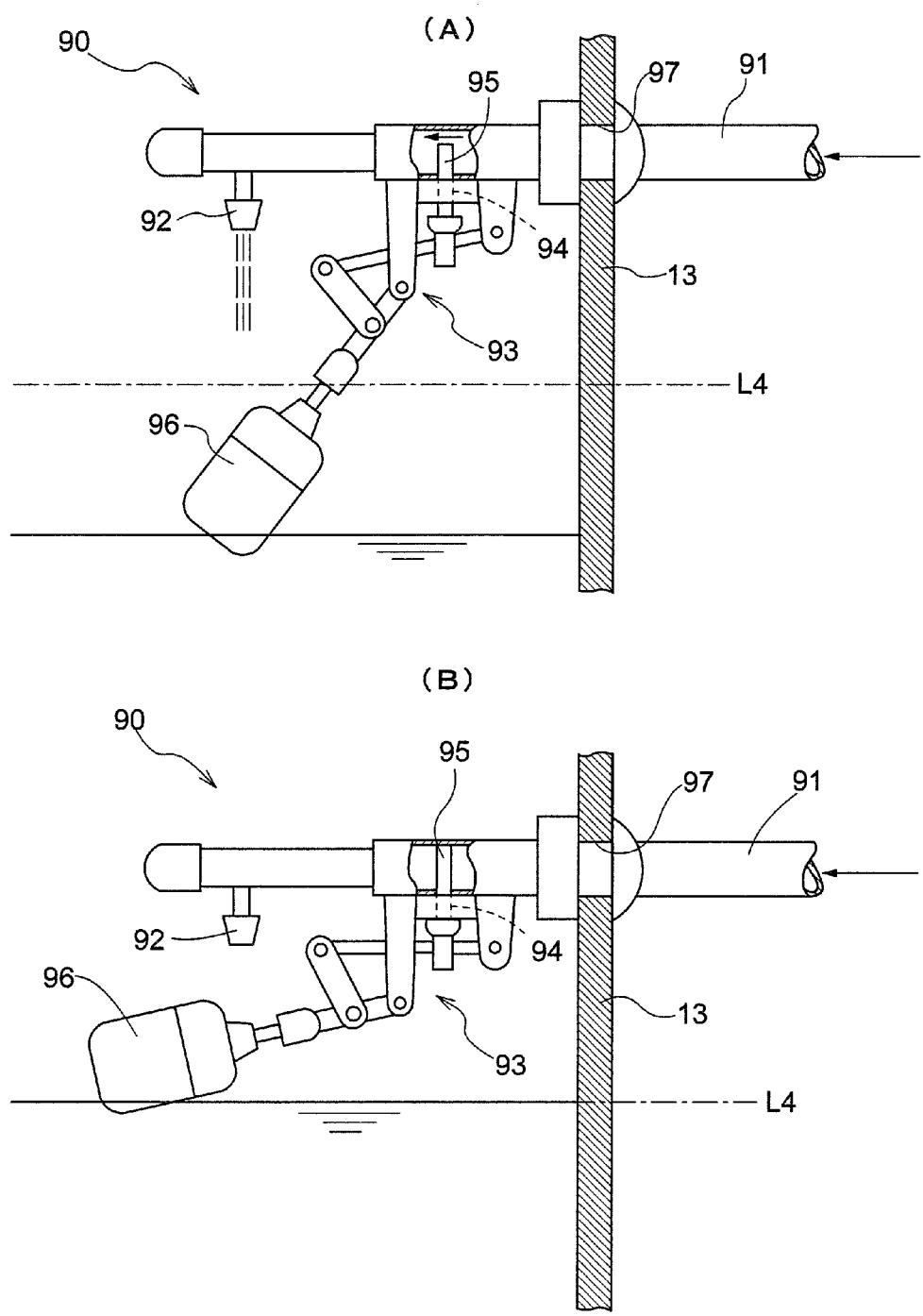
FIG. 32 is an enlarged view of a principal portion of a water-storage tank.

As shown in FIGS. 30 and 32, the water-storage tank 13 in the plant cultivating system 18 in accordance with the current embodiment is provided with the tap water-supply portion 90. The tap water-supply portion 90 includes a water pipe 91 through which water flows, a faucet 92 for supplying tap water, and an arm portion 93 pivotably connected to the water pipe 91, for example. The arm portion 93 includes a valve 95 that is vertically movable through a valve mounting bore 94 to open and close the water pipe 91, and a float member 96 exerting a floating force.

As shown in FIG. 32, in the tap water-supply portion 90, the water pipe 91 for supplying tap water is inserted into the water-storage tank 13 through a water pipe mounting bore 97 formed in a side face of the water-storage tank 13, whereby tap water is supplied to the water-storage tank 13 through the faucet 92.

The float member 96 attached to the arm portion 93 floats in the water-storage tank 13 to be movable vertically in accordance with the water level in the water-storage tank 13. The valve 95 is interlocked with vertical movement of the float member 96 by the arm portion 93 to move vertically to open or close the water pipe 91.

More particularly, as shown in FIG. 32(A), when the water level in the water-storage tank 13 becomes lower than the level L4, the float member 96 is moved to a position lower than the level L4. With this, the valve 95 is also moved downward through the arm portion 93 to open the water pipe 91, as a result of which tap water is supplied from the faucet 92.

On the other hand, as shown in FIG. 32(B), when tap water or rainwater is supplied to cause the water level in the water-storage tank 13 to reach the level L4 or above, the float member 96 is moved upward by its floating force. With this, the valve 96 is moved upward through the arm portion 93 to close the water pipe 91, as a result of which supply of tap water is stopped.

Thus, in the plant cultivating system 18 of the current embodiment, the rainwater collection control member 80 and the tap water-supply portion 90 serve to maintain the level of water to be stored in the water-storage tank 13 between the level L3 and the level L4 at all times.

As shown in FIG. 30, according to the current embodiment, the water-storage tank 13 is positioned higher than the plant cultivating apparatus while the water-supply tube 20 attached to the water-storage tank 13 is lower than the level L4. With this, when the feed-water valve 98 mounted on the water-supply tube 20 is opened, water stored in the water-storage tank 13 is supplied to the plant cultivating apparatus 16*b* or 21 by the difference in potential energy.

As noted above, the plant cultivating system 18 in accordance with the current embodiment allows water-supply to the plant to be completely automated by using both rainwater and tap water.

Not being illustrated, power for the rainwater collection control member 80 and the draw-up pump 12 may be supplied from a solar power generation system installed on the rooftop of the building framework, for example.

INDUSTRIAL APPLICABILITY

The rainwater catchment apparatus in accordance with the present invention is usable in the plant cultivating system in combination with the plant cultivating apparatus in order to use collected water in plant cultivation, for example.

The invention claimed is:

1. A rainwater catchment apparatus comprising:
   a rainwater inlet for introducing rainwater;
   a flange portion engaged with a peripheral portion of a rainwater outlet serving as a leading end of a drainage canal formed in a building framework for introducing rainwater into the rainwater inlet;
   a drain portion for discharging excessive water exceeding a predetermined level to the drainage canal;
   a reservoir freely fitted into the drainage canal through the rainwater outlet; and
   a pumping mechanism for pumping water stored in the reservoir to the outside through the rainwater inlet.

2. The rainwater catchment apparatus as defined in claim 1, wherein the pumping mechanism includes a draw-up pump for pumping water stored in the reservoir, and a pumping tube through which water flows pumped by the draw-up pump.

3. The rainwater catchment apparatus as defined in claim 1, wherein the rainwater inlet is provided with a filter portion for removing solid substances contained in rainwater.

4. A plant cultivating system comprising:
   the rainwater catchment apparatus as defined in claim 1;
   a plant cultivating apparatus for planting a plant; and
   a water-supply mechanism for supplying water pumped by the rainwater catchment apparatus to the plant cultivating apparatus.

5. The rainwater catchment apparatus as defined in claim 1, further comprising:
   a rainwater collection control member adapted to activate the pumping mechanism when the level of water in the reservoir reaches a first level and to stop the pumping mechanism when the level of water in the reservoir is lower than a second level.

* * * * *

UNITED STATES PATENT AND TRADEMARK OFFICE
CERTIFICATE OF CORRECTION

PATENT NO. : 8,689,819 B2  Page 1 of 1
APPLICATION NO. : 12/741521
DATED : April 8, 2014
INVENTOR(S) : Hashimoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 526 days.

Signed and Sealed this

Twenty-ninth Day of September, 2015

Michelle K. Lee
*Director of the United States Patent and Trademark Office*